US012469629B2

(12) United States Patent
Kobayashi et al.

(10) Patent No.: US 12,469,629 B2
(45) Date of Patent: Nov. 11, 2025

(54) REACTOR, CONVERTER AND POWER CONVERSION DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takehito Kobayashi, Mie (JP); Kohei Yoshikawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 754 days.

(21) Appl. No.: 17/784,260

(22) PCT Filed: Dec. 10, 2020

(86) PCT No.: PCT/JP2020/046172

§ 371 (c)(1),
(2) Date: Jun. 10, 2022

(87) PCT Pub. No.: WO2021/125065

PCT Pub. Date: Jun. 24, 2021

(65) Prior Publication Data

US 2024/0029930 A1 Jan. 25, 2024

(30) Foreign Application Priority Data

Dec. 19, 2019 (JP) ................................ 2019-229734

(51) Int. Cl.
*H01F 27/24* (2006.01)
*H01F 17/04* (2006.01)
(Continued)

(52) U.S. Cl.
CPC ........... *H01F 17/04* (2013.01); *H01F 27/255* (2013.01); *H01F 27/2828* (2013.01); *H01F 2017/048* (2013.01)

(58) Field of Classification Search
CPC ........................................................ H01F 27/24
(Continued)

(56) References Cited

U.S. PATENT DOCUMENTS 12,217,895 B2 * 2/2025 Kobayashi .............. H01F 37/00
2010/0026434 A1 * 2/2010 Okamoto .............. H01F 27/266 336/65
(Continued)

FOREIGN PATENT DOCUMENTS

JP 2007-067283 A 3/2007
JP 2013-131567 A 7/2013
(Continued)

OTHER PUBLICATIONS

International Search Report issued on Mar. 23, 2021 for WO 2021/125065 A1 (4 pages).

*Primary Examiner* — Ronald Hinson
(74) *Attorney, Agent, or Firm* — Venjuris, P.C.

(57) ABSTRACT

A reactor is provided with a coil including one winding portion, a magnetic core, a resin member for specifying mutual positions of the coil and the magnetic core, a case for accommodating an assembly including the coil, the magnetic core and the resin member, and a sealing resin portion to be filled into the case. The magnetic core includes a middle core portion to be arranged inside the winding portion, two side core portions to be arranged in parallel to
(Continued)

the middle core portion outside the winding portion, and two end core portions connecting the middle core portion and the side core portions on both end parts of the winding portion. The case includes a side wall portion in the form of a rectangular frame for surrounding the assembly. The side wall portion includes a pair of long side parts and a pair of short side parts.

11 Claims, 9 Drawing Sheets

(51) Int. Cl.
*H01F 27/255* (2006.01)
*H01F 27/28* (2006.01)

(58) Field of Classification Search
USPC .......................................................... 336/233
See application file for complete search history.

(56) References Cited

U.S. PATENT DOCUMENTS

| | | | | |
|---|---|---|---|---|
| 2012/0194311 | A1* | 8/2012 | Suzuki .................. | H01F 27/266<br>336/92 |
| 2015/0130576 | A1* | 5/2015 | Suzuki .................. | H01F 27/022<br>29/605 |
| 2015/0365015 | A1* | 12/2015 | Ito ......................... | H01F 27/325<br>336/208 |
| 2018/0122550 | A1 | 5/2018 | Inaba | |
| 2018/0190421 | A1 | 7/2018 | Yoshikawa et al. | |
| 2019/0131053 | A1* | 5/2019 | Uekusa ................. | H01F 27/361 |

FOREIGN PATENT DOCUMENTS

| | | |
|---|---|---|
| JP | 2019-029594 A | 2/2019 |
| JP | 2020-194953 A | 12/2020 |

* cited by examiner

REACTOR, CONVERTER AND POWER CONVERSION DEVICE

CROSS REFERENCE TO RELATED APPLICATIONS

This application is a national phase of PCT application No. PCT/JP2020/046172, filed on 10 Dec. 2020, which claims priority from Japanese patent application No. 2019-229734, filed on 19 Dec. 2019, all of which are incorporated herein by reference.

TECHNICAL FIELD

The present disclosure relates to a reactor, a converter and a power conversion device.

BACKGROUND

Patent Document 1 discloses a reactor including a coil, a magnetic core, a case for an assembly of the coil and the magnetic core and a sealing resin for covering the outer periphery of the assembly by being filled into the case. The coil includes two coil elements formed by winding a winding wire. Hereinafter, the coil elements are called winding portions. The magnetic core includes a pair of inner core portions to be covered by the respective winding portions and a pair of outer core portions to be arranged outside the winding portions to sandwich the pair of inner core portions. Patent Document 1 discloses to provide a resin introduction path for filling the sealing resin from a bottom side toward an opening side of the case in a side wall portion of the case.

Patent Document 2 discloses an assembly including a coil having one winding portion and a magnetic core having two E-shaped core pieces as one form of the assembly. The core piece includes a plate-like coupling portion arranged on an end surface of the coil, an inner core protrusion projecting from a central part of the coupling portion, and outer peripheral portions respectively projecting from parts near both edges of the coupling portion, and has an E-shaped outer appearance. The inner core protrusion is arranged in the winding portion. The outer peripheral portions are arranged to partially cover the outer peripheral surface of the coil.

PRIOR ART DOCUMENT

Patent Document

Patent Document 1: JP 2013-131567 A
Patent Document 2: JP 2016-201509 A

SUMMARY OF THE INVENTION

Problems to be Solved

A reactor of the present disclosure is provided with a coil including one winding portion, a magnetic core having parts to be arranged inside and outside the winding portion, a resin member for specifying mutual positions of the coil and the magnetic core, a case for accommodating an assembly including the coil, the magnetic core and the resin member, and a sealing resin portion to be filled into the case, wherein the magnetic core includes a middle core portion to be arranged inside the winding portion, two side core portions to be arranged in parallel to the middle core portion outside the winding portion, and two end core portions connecting the middle core portion and the side core portions on both end parts of the winding portion, the case includes a bottom plate portion, the assembly being placed on the bottom plate portion, a side wall portion in the form of a rectangular frame for surrounding the assembly, and an opening facing the bottom plate portion, the side wall portion includes a pair of long side parts and a pair of short side parts, the assembly is so arranged that exposed surfaces not facing the respective side core portions, out of an outer peripheral surface of the winding portion, face toward the long side parts, the resin member includes a protruding portion projecting toward one of the short side parts, and a gap is formed by an inner surface of the side wall portion including the one short side part and the protruding portion when the case is viewed from above.

A converter of the present disclosure includes the reactor of the present disclosure.

A power conversion device of the present disclosure includes the converter of the present disclosure.

DETAILED DESCRIPTION TO EXECUTE THE INVENTION

Technical Problem

Figure 1:
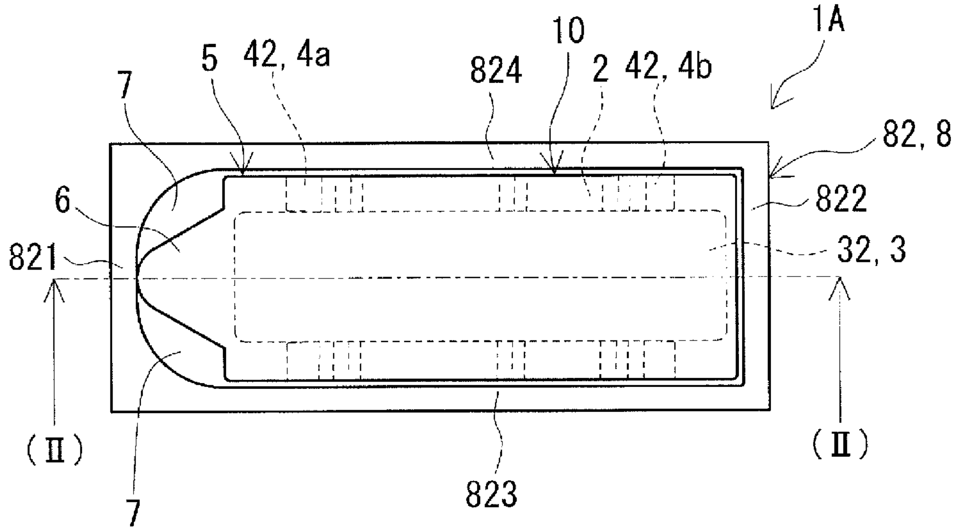
FIG. 1 is a schematic plan view of a reactor according to a first embodiment.

It is considered to obtain a reactor by accommodating an assembly including a coil having one winding portion and two E-shaped core pieces in a case and filling a sealing resin into the case. If a resin introduction path is provided in a side wall portion of the case as disclosed in Patent Document 1 in filling the sealing resin into the case, a special processing is necessary to form the resin introduction path. Further, a thickness of the side wall portion of the case needs to be increased due to a necessity to form the resin introduction path.

Further, the size reduction of the reactor is desired. Here, the size reduction of the reactor means that an installation area of the reactor is small and an interval between the assembly and the case is small. Accordingly, a structure capable of satisfactorily filling the sealing resin into the case while realizing the size reduction of the reactor is desired in the assembly including the coil having one winding portion.

One object of the present disclosure is to provide a reactor small in size and excellent in productivity. Another object of the present disclosure is to provide a converter including the above reactor. Still another object of the present disclosure is to provide a power conversion device including the above converter.

Effect of Present Disclosure

The reactor of the present disclosure is small in size and excellent in productivity. The converter of the present disclosure and the power conversion device of the present disclosure are small in size and excellent in productivity.

Description of Embodiments of Present Disclosure

First, embodiments of the present disclosure are listed and described.

(1) The reactor of the present disclosure is provided with a coil including one winding portion, a magnetic core having parts to be arranged inside and outside the winding portion, a resin member for specifying mutual positions of the coil and the magnetic core, a case for accommodating an assembly including the coil, the magnetic core and the resin member, and a sealing resin portion to be filled into the case, wherein the magnetic core includes a middle core portion to be arranged inside the winding portion, two side core portions to be arranged in parallel to the middle core portion outside the winding portion, and two end core portions connecting the middle core portion and the side core portions on both end parts of the winding portion, the case includes a bottom plate portion, the assembly being placed on the bottom plate portion, a side wall portion in the form of a rectangular frame for surrounding the assembly, and an opening facing the bottom plate portion, the side wall portion includes a pair of long side parts and a pair of short side parts, the assembly is so arranged that exposed surfaces not facing the respective side core portions, out of an outer peripheral surface of the winding portion, face toward the long side parts, the resin member includes a protruding portion projecting toward one of the short side parts, and a gap is formed by an inner surface of the side wall portion including the one short side part and the protruding portion when the case is viewed from above.

In the reactor of the present disclosure, the assembly is so arranged in the case that the exposed surfaces not facing the respective side core portions, out of the outer peripheral surface of the winding portion, face toward the long side parts. This arrangement mode is a called an upright type below. The upright types include a horizontal type and a vertical type. In the horizontal type, the assembly is so accommodated in the case that the exposed surfaces of the winding portion face toward the long side parts of the side wall portion and an axial direction of the winding portion is parallel to the bottom plate portion of the case. In the vertical type, the assembly is so accommodated in the case that the exposed surfaces of the winding portion face toward the long side parts of the side wall portion and the axial direction of the winding portion is perpendicular to the bottom plate portion of the case. On the other hand, in the reactor described in Patent Document 2, the assembly is so accommodated in the case that the exposed surfaces of the winding portion face toward the bottom plate portion and the opening of the case. That is, in the reactor described in Patent Document 2, the assembly is so accommodated in the case that the respective side core portions face the side wall portion of the case. The arrangement mode of the assembly in the reactor described in Patent Document 2 is called a flat type.

Since the exposed surfaces of the winding portion are facing the side wall portion in the reactor of the present disclosure, heat of the coil is easily dissipated to the case. Thus, heat dissipation is better when the arrangement mode of the assembly is the upright type than when the arrangement mode of the assembly is the flat type. In improving heat dissipation, an area of the exposed surfaces of the winding portion is, for example, made larger than an area of surfaces of the winding portion facing the respective side core portions. If the area of the exposed surfaces of the winding portion is larger than the area of the surfaces facing the respective side core portions, an installation area of the assembly with respect to the bottom plate portion of the case can be made smaller when the arrangement mode of the assembly is the upright type than when the arrangement mode of the assembly is the flat type. Such a reactor of the present disclosure is thin and small in size in addition to being excellent in heat dissipation.

In the reactor of the present disclosure, the resin member, which is a constituent member of the assembly, includes the protruding portion projecting toward the one short side part of the side wall portion. The reactor of the present disclosure includes the gap formed by the inner surface of the side wall portion including the one short side part, toward which the protruding portion is facing, and the protruding portion when the case is viewed from above. Since the reactor of the present disclosure includes the gap, a resin, which will become the sealing resin portion, can be filled into the case through the gap with the assembly accommodated in the case in forming the sealing resin portion. For example, the resin can be filled into the case by inserting a nozzle for injecting the resin into the gap and injecting the resin from the bottom plate portion side of the case through the nozzle. The size of the gap can be adjusted according to the size of the protruding portion, and the gap, into which a nozzle of a large diameter is insertable, can be easily formed. If the diameter of the nozzle is large, an operation of filling the resin, which will become the sealing resin portion, can be efficiently performed. Therefore, the reactor of the present disclosure is excellent in productivity.

In the reactor of the present disclosure, the resin can be injected by inserting the nozzle into the gap in forming the sealing resin portion. Thus, in the reactor of the present disclosure, a resin introduction path needs not be provided in the side wall portion of the case and no special processing is necessary for the case. Thus, the reactor of the present disclosure is excellent in the manufacturability of the case and, consequently, excellent in productivity. Further, the resin introduction path needs not be provided in the side wall portion of the case and a thickness of the side wall portion needs not be increased. In the reactor of the present disclosure, the resin can be injected by inserting the nozzle into the gap provided on the side of the one short side part. Thus, in the reactor of the present disclosure, an interval between the side wall portion excluding the one short side part and the assembly can be reduced as compared to the case where the other short side part and the long side parts are provided with protruding portions. Therefore, the reactor of the present disclosure can be reduced in size.

Besides, the following effects can be expected for the reactor of the present disclosure. If the resin is injected by inserting the nozzle into the gap, the resin is injected from the side of the one short side part and flows toward the other short side part. Specifically, the resin injected from the nozzle flows between the assembly and the long side parts from the side of the one short side part and merges on the side of the other short side part. Thus, a merging point of the resin is created at a location distant from a location where the resin was injected. In this case, air bubbles mixed into the resin float up while the resin is flowing from the side of the one short side part toward the side of the other short side part, and the air bubbles in the resin are easily removed. Thus, the remaining of the air bubbles in the sealing resin portion can be reduced by injecting the resin from the side of the one short side part. Further, if the resin is injected from the side of the one short side part, the merging point of the resin is one location on the side of the other short side part. Since the entrainment of air bubbles easily occurs at the merging point of the resin, less merging points are preferable. Since the resin merges at one location by injecting the resin from the side of the one short side part, the remaining of air bubbles is easily reduced.

(2) As one aspect of the reactor, the resin member includes a molded resin portion for at least partially covering the magnetic core, and the protruding portion is provided on the molded resin portion.

In the above aspect, the magnetic core can be integrally held and, consequently, the assembly can be integrally held by the molded resin portion. The assembly is obtained by fabricating a set by assembling the coil and the magnetic core and forming the molded resin portion for this set. If the protruding portion is provided on the molded resin portion, the protruding portion can be formed together by the resin, which will become the molded resin portion, in forming the molded resin portion for the set. Therefore, the above aspect is excellent in productivity.

(3) As one aspect of the reactor, the resin member includes a pair of frame-like members to be provided on the both end parts of the winding portion, each frame-like member includes a pair of first frame pieces to be arranged between the middle core portion and the side core portions, and a second frame piece connecting the pair of first frame pieces along the exposed surface of the winding portion, and the protruding portion is provided on the second frame piece in one of the frame-like members.

In the above aspect, the winding portion and the magnetic core can be held in a positioned state by the frame-like members. The assembly is obtained by assembling the coil, the magnetic core and the frame-like members. If the protruding portion is provided on the frame-like member, the protruding portion can be formed at a predetermined position of the assembly only by assembling the coil, the magnetic core and the frame-like members. The second frame piece is not arranged between the middle core portion and the side core portions and is located outside the magnetic core. Thus, if the protruding portion is provided on the second frame piece, the protruding portion is easily caused to project toward the one short side part and the shape of the protruding portion is easily simplified.

(4) As one aspect of the reactor, the assembly is so accommodated in the case that an axial direction of the winding portion is parallel to the bottom plate portion.

In the above aspect, an arrangement mode of the assembly is a horizontal type. If the arrangement mode of the assembly is the horizontal type, the both end parts of the winding portion are easily pulled out to the opening side of the case on the sides of the respective short side parts of the case. Further, if the arrangement mode of the assembly is the horizontal type, the assembly is easily reduced in height as compared to the case where the arrangement mode is a vertical type. This is because the exposed surfaces not facing the respective side core portions, out of the outer peripheral surface of the winding portion, are generally longer along the axial direction of the winding portion than along a direction orthogonal to the axial direction of the winding portion.

(5) As one aspect of the reactor, the protruding portion is arranged on the opening side.

In the above aspect, the assembly is easily stably supported in the case. Further, in the above aspect, the assembly is easily held at a predetermined position in the case when the resin, which will become the sealing resin portion, is filled into the case.

(6) As one aspect of the reactor, a tip of the protruding portion in a projecting direction contacts an inner surface of the short side part.

In the above aspect, the assembly can be positioned with respect to the case by providing the protruding portion on the resin member, which is a constituent member of the assembly. Particularly, a positional deviation of the assembly caused by a flow of the resin can be suppressed by the contact of the protruding portion with the inner surface of the short side part when the resin, which will become the sealing resin portion, is filled into the case. Thus, the above aspect is more excellent in productivity due to the contact of the protruding portion with the inner surface of the short side part.

(7) As one aspect of the reactor, the protruding portion includes a first surface located on the bottom plate portion side, a second surface located on the opening side, and a hole penetrating through the first surface and the second surface, and the sealing resin portion includes a first resin portion filled inside the hole, and a second resin portion continuous with the first resin portion, the second resin portion being provided in contact with the first surface and the second surface.

In the above aspect, the protruding portion includes the hole, and the protruding portion and the sealing resin portion can be firmly joined and, consequently, the assembly and the sealing resin portion can be firmly joined by filling a part of the sealing resin portion in the hole. This is because the first resin portion filled in the hole and the second resin portion provided in contact with the first and second surfaces are caught by the protruding portion. Besides, in the above aspect, a resin filled state on the side of the one short side part can be confirmed through the hole in forming the sealing resin portion by including the hole in the protruding portion. Further, in the above aspect, air bubbles mixed into the resin being filled on the side of the one short side part can be removed through the hole in forming the sealing resin portion by including the hole in the protruding portion. That is, the hole provided in the protruding portion fulfills a function as a confirmation hole for confirming the resin filled state and a function as a deaeration hole for removing air bubbles mixed into the resin when the sealing resin portion is formed. After the sealing resin portion is formed, the hole provided in the protruding portion fulfills a function as a hooking structure for joining the assembly and the sealing resin portion.

(8) As one aspect of the reactor, the short side part includes a mounting seat for supporting the protruding portion, and the protruding portion and the mounting seat are fastened.

In the above aspect, the assembly can be firmly fixed to the case by fastening the protruding portion to the mounting seat. In the above aspect, the detachment of the assembly from the case, for example, due to an impact or vibration can be avoided.

(9) A converter according to an embodiment of the present disclosure includes the reactor of any one of (1) to (8) described above.

The converter of the present disclosure is small in size and excellent in productivity since including the reactor of the present disclosure.

(10) A power conversion device according to an embodiment of the present disclosure includes the converter of (9) described above.

The power conversion device of the present disclosure is small in size and excellent in productivity since including the converter of the present disclosure.

Details of Embodiments of Present Disclosure

Specific examples of reactors according to embodiments of the present disclosure are described below with reference to the drawings. In figures, the same reference signs denote the same components. In each figure, some of components may be shown in an exaggerated or simplified manner for the convenience of description. A dimension ratio of each part in figures may be different from an actual one. Note that the present invention is not limited to these illustrations and is intended to be represented by claims and include all changes in the scope of claims and in the meaning and scope of equivalents.

First Embodiment

Summary

Figure 2:
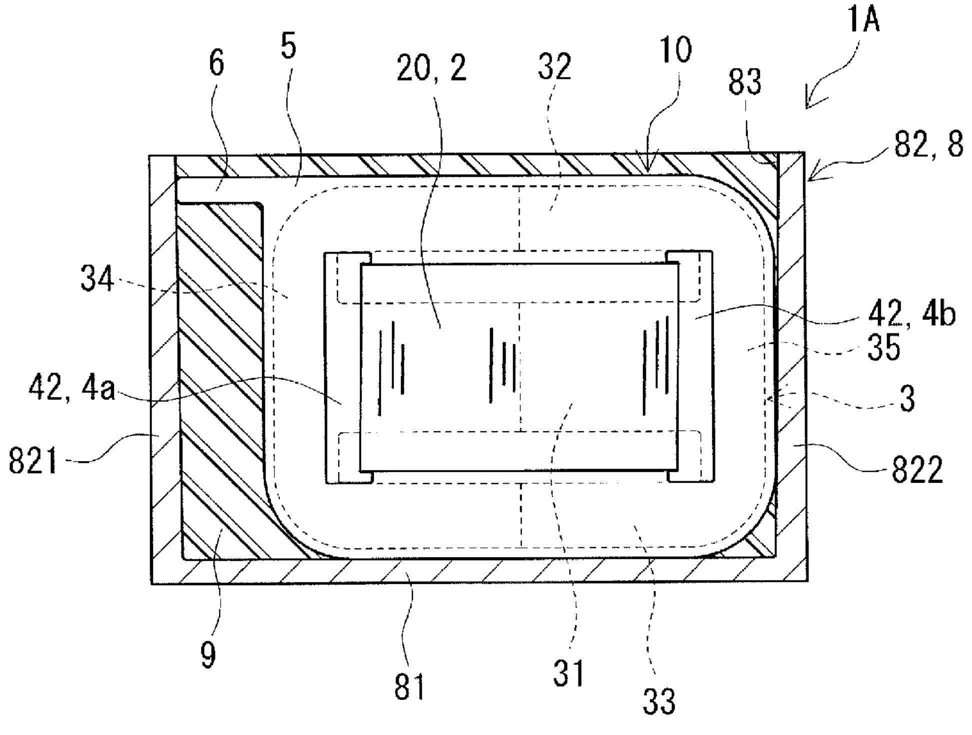
FIG. 2 is a schematic side view partly in section of the reactor according to the first embodiment.

A reactor 1A according to a first embodiment is described with reference to FIGS. 1 to 5. As shown in FIG. 2, the reactor 1A includes a coil 2, a magnetic core 3, frame-like members 4*a*, 4*b*, a molded resin portion 5, a case 8 and a sealing resin portion 9. The coil 2 includes one winding portion 20. The magnetic core 3 includes parts to be arranged inside and outside the winding portion 20. The frame-like members 4*a*, 4*b* and the molded resin portion 5 constitute a resin member for specifying mutual positions of the coil 2 and the magnetic core 3. The frame-like members 4*a*, 4*b* are provided on end parts of the winding portion 20. The molded resin portion 5 at least partially covers the magnetic core 3. The case 8 accommodates an assembly 10 including the coil 2, the magnetic core 3, the frame-like members 4*a*, 4*b* and the molded resin portion 5. The sealing resin portion 9 is filled into the case 8. One feature of the reactor 1A of the first embodiment is that an arrangement mode of the assembly 10 is a horizontal type to be described later. Another feature of the reactor 1A of the first embodiment is that the molded resin portion 5 includes a protruding portion 6. As shown in FIG. 1, the protruding portion 6 projects toward one short side part 821 of a side wall portion 82 constituting the case 8 and forms predetermined gaps 7 between the inner surface of the side wall portion 82 including the one short side part 821 and the protruding portion 6 when the case 8 is viewed from above.

The sealing resin portion 9 is not shown in FIG. 1. FIG. 2 is a partial section along (II)-(II) shown in FIG. 1. In FIG. 2, the external appearance of the assembly 10 in the case 8 when viewed from a side surface is shown to facilitate the understanding of the internal structure of the reactor 1A and cross-sections of the case 8 and the sealing resin portion 9 cut by a plane parallel to the side surface are shown. In the following description, the side of a bottom plate portion 81 of the case 8 is a lower side and the side of an opening 83 facing the bottom plate portion 81 is an upper side. This vertical direction is a height direction. The height direction is a depth direction of the case 8. Further, a direction orthogonal to the height direction and extending along long side parts 823, 824 of the side wall portion 82 in the case 8 is a length direction. A direction orthogonal to the height direction and extending along short side parts 821, 822 of the side wall portion 82 in the case 8 is a width direction. The vertical direction is a vertical direction on the plane of FIG. 2. The length direction is a lateral direction on the planes of FIGS. 1 and 2. The width direction is a vertical direction on the plane of FIG. 1.

The configuration of the reactor 1A is described in detail below.

[Coil]

Figure 3:
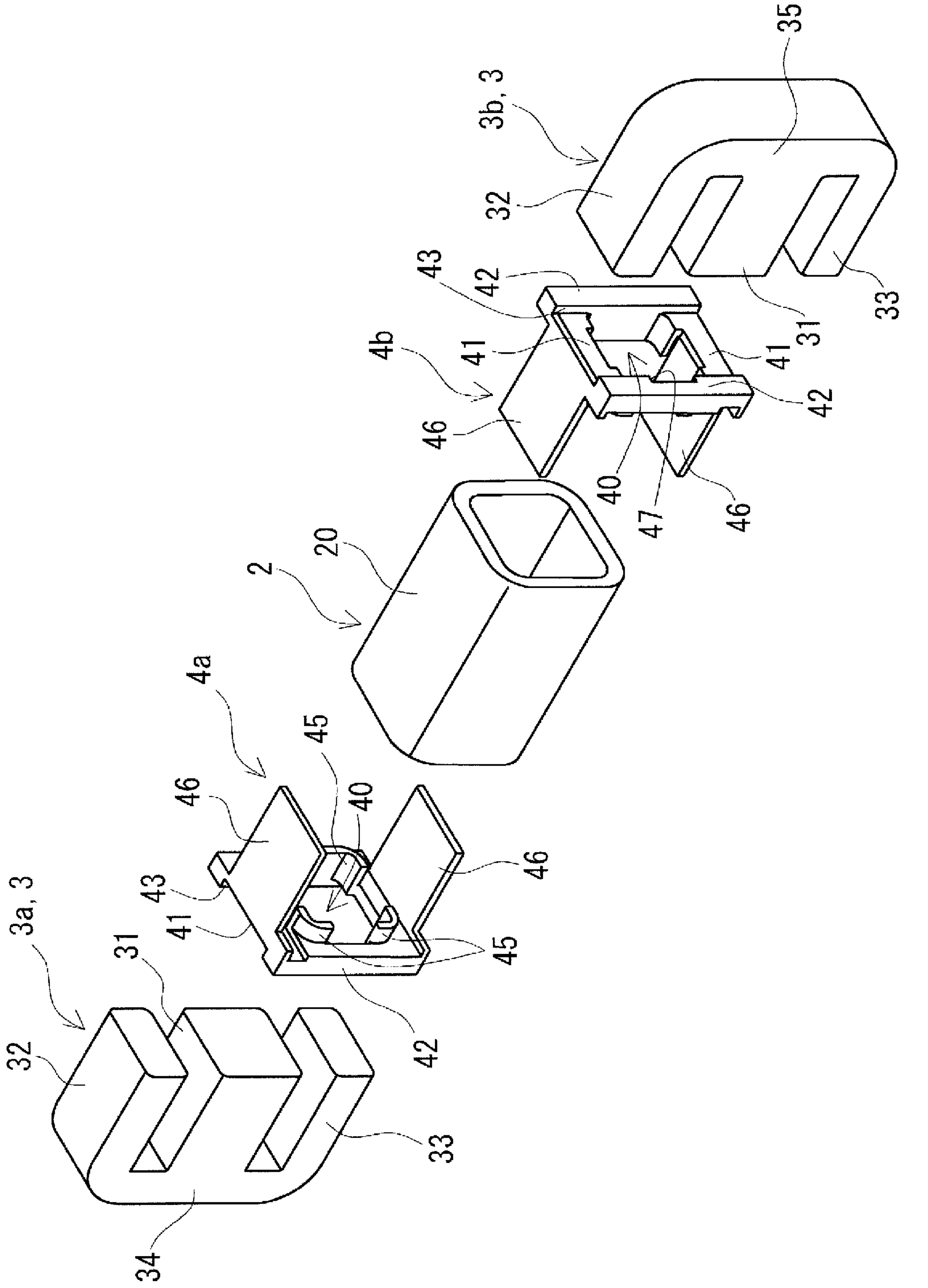
FIG. 3 is a schematic exploded perspective view of a part of an assembly provided in the reactor according to the first embodiment.

As shown in FIGS. 2 and 3, the coil 2 includes one winding portion 20. The winding portion 20 is formed by spirally winding one winding wire. Both end parts of the winding wire are pulled out from the respective end parts in an axial direction of the winding portion 20. The both end parts of the winding wire pulled out from the winding portion 20 are pulled outside from the side of the opening 83 of the case 8. Unillustrated terminal fittings are mounted on the both pulled-out end parts. An unillustrated external device such as a power supply is connected to the terminal fittings. Note that only the winding portion 20 is shown and the end parts of the winding wire and the like are not shown in FIG. 1 and the like.

A coated wire including a conductor wire and an insulation coating can be cited as the winding wire. Copper and the like can be cited as a constituent material of the conductor wire. Resins such as polyamide imide can be cited as a constituent material of the insulation coating. A coated rectangular wire having a rectangular cross-sectional shape, a coated round wire having a circular cross-sectional shape and the like can be cited as the coated wire.

The winding portion 20 of this example is an edgewise coil in the form of a rectangular tube formed by winding a coated rectangular wire in an edgewise manner. Thus, an end surface shape of the winding portion 20 when viewed from the axial direction is a rectangular shape. That is, the winding portion 20 has four flat surfaces and four corners. The corners of the winding portion 20 are rounded. Surfaces of the winding portion 20 other than the corners are substantially constituted by flat surfaces. Thus, as shown in FIGS. 1 and 2, the flat surfaces of the winding portion 20 and the flat inner surface of the side wall portion 82 in the case 8 can face each other. Accordingly, a large facing area of the winding portion 20 and the inner surface of the side wall portion 82 is easily ensured. Further, if the flat surfaces of the winding portion 20 and the flat inner surface of the side wall portion 82 are facing each other, an interval between the winding portion 20 and the side wall portion 82 is easily narrowed.

[Magnetic Core]

As shown in FIGS. 2 and 3, the magnetic core 3 includes one middle core portion 31, two side core portions 32, 33 and two end core portions 34, 35. The middle core portion 31 is arranged inside the winding portion 20. The side core portions 32, 33 and the end core portions 34, 35 are arranged outside the winding portion 20. The side core portions 32, 33 are arranged in parallel to the middle core portion 31 outside the winding portion 20. The end core portions 34, 35 connect the middle core portion 31 and the side core portions 32, 33 on both end parts of the winding portion. That is, the two end core portions 34, 35 are arranged to sandwich one middle core portion 31 and two side core portions 32, 33 from both ends. A magnetic flux flows in the magnetic core 3 to form a closed magnetic path when the coil 2 is excited by connecting the middle core portion 31, the side core portions 32, 33 and the end core portions 34, 35.

The shape of the middle core portion 31 substantially corresponds to the inner peripheral shape of the winding portion 20. A gap is present between the inner peripheral surface of the winding portion 20 and the outer peripheral surface of the middle core portion 31. A resin for constituting the molded resin portion 5 to be described later is filled into this gap. In this example, the middle core portion 31 has a square column shape, more specifically a rectangular column shape, and the end surface shape of the middle core portion 31 when viewed from the axial direction is a rectangular shape. Corners of the middle core portion 31 are rounded to extend along the corners of the winding portion 20.

The shapes of the side core portions 32, 33 are not particularly limited if the side core portions 32, 33 are shaped to extend in the axial direction of the winding portion 20 outside the winding portion 20. In this example, the side core portions 32, 33 are in the form of rectangular parallelepipeds extending in the axial direction of the winding portion 20. The side core portions 32, 33 are arranged to face two surfaces located at positions opposite to each other across an axis of the winding portion 20, out of four surfaces constituting the outer peripheral surface of the winding portion 20. That is, the side core portions 32, 33 are arranged to sandwich the two surfaces located at the positions opposite to each other across the axis of the winding portion 20, out of the four surfaces constituting the outer peripheral surface of the winding portion 20, from outer sides. The side core portions 32, 33 are arranged to face the respective upper and lower surfaces of the winding portion 20 in FIG. 2. The surfaces of the winding portion 20 not facing the side core portions 32, 33 are exposed from the magnetic core 3. The surfaces of the winding portion 20 not facing the side core portions 32, 33, i.e. the surfaces of the winding portion 20 exposed from the magnetic core 3, may be called exposed surfaces below.

The shapes of the end core portions 34, 35 are not particularly limited if the end core portions 34, 35 are shaped to connect the end parts of the one middle core portion 31 and the two side core portions 32, 33. In this example, the end core portions 34, 35 are in the form of rectangular parallelepipeds long in an arrangement direction of the one middle core portion 31 and the two side core portions 32, 33.

In the middle core portion 31 and the side core portions 32, 33, surfaces facing in directions orthogonal to both the arrangement direction of the respective core portions 31, 32 and 33 and longitudinal directions of the respective core portions 31, 32 and 33 are flush with each other. In FIG. 2, surfaces of the middle core portion 31, the side core portions 32, 33 and the end core portions 34, 35 on sides forward and backward of the plane of FIG. 2 are flush with each other. Thus, the exposed surfaces of the winding portion 20 project further than the surfaces of the side core portions 32, 33 and the end core portions 34, 35 facing in the same directions as the exposed surfaces. With the molded resin portion 5 to be described later provided for a set of the coil 2, the magnetic core 3 and the frame-like members 4*a*, 4*b*, the magnetic core 3 is embedded in the molded resin portion 5, but the above exposed surfaces of the winding portion 20 are exposed from the molded resin portion 5.

The magnetic core 3 of this example includes two E-shaped core pieces 3*a*, 3*b* as shown in FIG. 3. The respective core pieces 3*a*, 3*b* have the same shape and the same size. The core piece 3*a* includes the end core portion 34 and three short core pieces. The three short core pieces are provided at intervals in a longitudinal direction of the end core portion 34. Thus, the core piece 3*a* has an E-shaped external appearance. The three short core pieces are respectively half the middle core portion 31, half the side core portion 32 and half the side core portion 33. The core piece constituting the middle core portion 31 rises from a central part in the longitudinal direction of the end core portion 34, and the core pieces constituting the side core portions 32, 33 rise from the vicinities of both longitudinal edges of the end core portion 34. The core piece 3*b* includes three short core pieces composed of half the middle core portion 31, half the side core portion 32 and half the side core portion 33.

<Constituent Material>

The magnetic core 3 is constituted by a compact containing a soft magnetic material. Examples of the soft magnetic material include metals such as iron and iron alloy and non-metals such as ferrite. Examples of the iron alloy include a Fe—Si alloy and a Fe—Ni alloy. Powder compacts and compacts of composite materials can be cited as the compact containing the soft magnetic material.

The powder compact is obtained by compression-forming a powder made of a soft magnetic material, i.e. a soft magnetic powder. The powder compact has a higher ratio of the soft magnetic powder occupying the core piece as compared to composite materials. A content of the soft magnetic powder in the powder compact is, for example, more than 80% by volume and, further, 85% by volume if the powder compact is 100% by volume.

In a compact of a composite material, a soft magnetic powder is dispersed in a resin. The compact of the composite material is obtained by filling a raw material, in which the soft magnetic powder is mixed and dispersed in the uncured resin, and solidifying the resin. Magnetic properties such as a relative magnetic permeability and a saturated magnetic flux density of the composite material are easily controlled by adjusting a content of the soft magnetic powder in the resin. A content of the soft magnetic powder in the compact of the composite material is, for example, 30% by volume or more and 80% by volume or less if the composite material is 100% by volume.

The soft magnetic powder is an aggregate of soft magnetic particles. The soft magnetic particles may be coated particles having insulation coatings on the surfaces thereof. Phosphates and the like can be cited as a constituent material of the insulation coating. The resin of the composite material is, for example, a thermosetting resin or thermoplastic resin. Examples of the thermosetting resin include an epoxy resin, a phenol resin, a silicone resin and a urethane resin. Examples of the thermoplastic resin include a polyphenylene sulfide (PPS) resin, a polyamide (PA) resin (e.g. nylon 6, nylon 66 and nylon 9T), a liquid crystal polymer (LCP), a polyimide (PI) resin and a fluororesin. The composite material may contain a filler in addition to the resin. By containing the filler, the heat dissipation of the composite material can be improved. A powder made of a nonmagnetic material such as ceramics and carbon nanotubes can be, for example, utilized as the filler. Examples of the ceramics include oxides, nitrides and carbides of metals or non-metals. Examples of the oxides include alumina, silica and magnesium oxide. Examples of the nitrides include silicon nitride, aluminum nitride and boron nitride. Examples of the carbides include silicon carbide.

[Frame-Like Members]

The reactor 1A of this example includes two frame-like members 4*a*, 4*b*. As shown in FIGS. 2 and 3, the frame-like members 4*a*, 4*b* are arranged on the respective end parts of the winding portion 20. The frame-like members 4*a*, 4*b* specify the mutual positions of the coil 2 and the magnetic core 2 to hold a positioned state. Further, the frame-like members 4*a*, 4*b* ensure electrical insulation between the coil 2 and the magnetic core 3.

The both frame-like members 4*a*, 4*b* have the same basic configuration. The frame-like member 4*a*, 4*b* includes a pair of first frame pieces 41 and a pair of second frame pieces 42. The first frame pieces 41 are arranged between the middle core portion 31 and the side core portions 32, 33. Further, the first frame pieces 41 are arranged between the end surface of the winding portion 20 and the end core portion 34, 35. That is, the first frame pieces 41 are arranged in spaces constituted by the middle core portion 31, the side core portions 32 and the end core portion 34, 35. The second frame pieces 42 connect the pair of first frame pieces 41 to extend along the exposed surfaces of the winding portion 20. The outer surfaces of the second frame pieces 42 are substantially flush with the exposed surfaces of the winding portion 20. Thus, with the molded resin portion 5 to be described later provided for the set of the coil 2, the magnetic core 3 and the frame-like members 4*a*, 4*b*, surfaces of the second frame pieces 42 facing in the same directions as the exposed surfaces are exposed from the middle core portion 5. The outer peripheral surfaces of the frame-like members 4*a*, 4*b* are substantially constituted by flat surfaces. Out of the outer peripheral surface of the frame-like member 4*a*, 4*b*, the outer surfaces of the pair of second frame pieces 42 are facing the long side parts 823, 824 (FIG. 1) of the side wall portion 82 of the case 8.

A through hole 40 is constituted by the pair of first frame pieces 41 and the pair of second frame pieces 42. The middle core portion 31 is inserted in the through hole 40. The through hole 40 has a shape substantially corresponding to the outer peripheral shape of the middle core portion 31. The inner peripheral surface of the through hole 40 is provided with cuts partially constituting a gap between the outer peripheral surface of the middle core portion 31 and the inner peripheral surface of the through hole 40 with the middle core portion 31 inserted. The resin for constituting the middle core portion 5 to be described later is filled into the gap constituted by the cuts.

The frame-like member 4*a*, 4*b* of this example includes a recess 43 on the side of the end core portion 34, 35. Specifically, surfaces of the first frame pieces 41 on the side of the end core portion 34, 35 are recessed from surfaces of the second frame pieces 42 on the side of the end core portion 34, 35. Edge parts of the end core portion 34, 35 on the side of the winding portion 20 are fit into the recess 43. The end core portion 34, 35 is held in the frame-like member 4*a*, 4*b* by this recess 43. The second frame piece 42 is provided with a cut 47 (FIG. 3) constituting a gap between the second frame piece 42 and the end core portion 34, 35 with the end core portion 34, 35 fit in the recess 43. The resin for constituting the middle core portion 5 to be described later is filled into the gap constituted by the cut 47.

Further, the frame-like member 4*a*, 4*b* of this example includes an inner projecting piece 45 and outer projecting pieces 46. The inner projecting piece 45 projects toward the winding portion 20 from four corners of the through hole 40. In this example, projecting pieces projecting from two specific adjacent corners, out of the four corners of the through hole 40, are connected. That is, the inner projecting piece 45 of this example is composed of three projecting pieces. The inner projecting piece 45 is formed along the outer peripheral surface of the middle core portion 31. The middle core portion 31 is held in the frame-like member 4*a*, 4*b* and an interval between the winding portion 20 and the middle core portion 31 is held by this inner projecting piece 45. The outer projecting pieces 46 are constituted by plate-like pieces projecting toward the winding portion 20 from the outer edges of the first frame pieces 41. The outer projecting pieces 46 are interposed between the winding portion 20 and the side core portions 32, 33. The outer projecting pieces 46 extend up to a central part in the axial direction of the winding portion 20. Insulation between the winding portion 20 and the side core portions 32, 33 is ensured by these outer projecting pieces 46.

<Constituent Material>

Examples of a constituent material of the frame-like members 4*a*, 4*b* include electrically insulating materials. Resins are typical examples of the electrically insulating materials. Specific examples of resins include thermosetting resins and thermoplastic resins. Examples of thermosetting resins include an epoxy resin, a phenol resin, a silicone resin, a urethane resin and an unsaturated polyester resin. Examples of thermoplastic resins include a PPS resin, a PA resin, an LCP, a PI resin, a fluororesin, a polytetrafluoroethylene (PTFE) resin, a polybutylene terephthalate (PBT) resin and an acrylonitrile-butadiene-styrene (ABS) resin. The constituent material of the frame-like members 4*a*, 4*b* may contain a filler in addition to the resin. By containing the filler, the heat dissipation of the frame-like members 4*a*, 4*b* can be improved. A filler similar to the one used in the aforementioned composite material can be utilized as this filler. In this example, the constituent material of the frame-like members 4*a*, 4*b* is the PPS resin.

[Molded Resin Portion]

The reactor 1A of this example includes the molded resin portion 5. As shown in FIG. 2, the molded resin portion 5 at least partially covers the side core portions 32, 33 and the end core portions 34, 35. Further, the molded resin portion 5 is interposed between the inner peripheral surface of the winding portion 20 and the outer peripheral surface of the middle core portion 31 via the cuts 47 provided in the second frame pieces 42 of the frame-like members 4*a*, 4*b*. The two E-shaped core pieces 3*a*, 3*b* are integrally held and the coil 2, the magnetic core 3 and the frame-like members 4*a*, 4*b* are integrated by the molded resin portion 5. Thus, the assembly 10 can be handled as an integrated object. Note that, out of the outer peripheral surface of the winding portion 20, the exposed surfaces not facing the two side core portions 32, 33 are exposed from the molded resin portion 5 without being covered by the molded resin portion 5. Although the entire regions of the exposed surfaces of the winding portion 20 are exposed from the molded resin portion 5 in FIG. 2, parts of the exposed surfaces near the corners of the winding portion 20 are actually covered by the molded resin portion 5.

<Constituent Material>

A resin similar to the aforementioned one for constituting the frame-like members 4*a*, 4*b* can be utilized as a resin for constituting the molded resin portion 5. The constituent material of the molded resin portion 5 may contain the aforementioned filler in addition to the resin. In this example, the molded resin portion 5 is made of PPS resin.

[Protruding Portion]

As shown in FIGS. 1 and 2, the molded resin portion 5 includes the protruding portion 6 projecting toward the one short side part 821. The protruding portion 6 is a component integrally formed to the molded resin portion 5. The protruding portion 5 of this example is a solid body having no through hole or the like. As shown in FIG. 1, the predetermined gaps 7 are formed between the protruding portion 6 and the inner surface of the side wall portion 82 including the one short side part 821.

The position and number of the protruding portion 6 are not particularly limited. The position of the protruding portion 6 along the depth direction of the case 8 is preferably on the side of the opening 83 of the case 8. By locating the protruding portion 6 on the side of the opening 83 of the case 8, the gaps 7 are easily formed. For example, the inner surface of the side wall portion 82 of the case 8 may be inclined to expand from the side of the bottom plate portion 81 toward the side of the opening 83. If the inner surface of the side wall portion 82 is inclined, the interval between the case 8 and the assembly 10 is larger on the side of the opening 83. Thus, the gaps 7 are easily stably formed by locating the protruding portion 6 on the side of the opening 83. Further, the position of the protruding portion 6 along the width direction of the case 8 is preferably a widthwise center of the short side part 821. By providing one protruding portion 6 in the widthwise center of the short side part 821, the protruding portion 6 is easily formed. Further, by providing one protruding portion 6 in the widthwise center of the short side part 821, the gaps 7 are easily stably formed. The position of the protruding portion 6 may be deviated from the center of the short side part 821. It is sufficient to provide at least one protruding portion 6, but a plurality of protruding portions 6 may be provided.

The shape of the protruding portion 6 is not particularly limited. In this example, the protruding portion 6 has a triangular shape in a plan view as shown in FIG. 1. The shape of the protruding portion 6 is not limited to the triangular shape in a plan view and may be another shape such as a rectangular shape, a polygonal shape, a semicircular shape or a semielliptical shape. The size of the protruding portion 6 is set to form the gaps 7 of predetermined sizes. For example, a projecting length of the protruding portion 6 is 5 mm or more and 15 mm or less and, further, 6 mm or more and 12 mm or less. If the projecting length of the protruding portion 6 is too long, the long side parts 823, 824 become long and the case 8 is enlarged. Further, a maximum width of the protruding portion 6 is smaller than a width of the molded resin portion 5. The width of the protruding portion 6 is, for example, set such that a minimum gap between at least one long side part 823, 824 and the outer peripheral surface of the protruding portion 6 is 5 mm or more and, further, 6 mm or more.

The protruding portion 6 has such a thickness as not to be easily deformed or broken. The thickness here is a dimension in the height direction, i.e. a vertical dimension on the plane of FIG. 2. The thickness of the protruding portion 6 of this example is about equal to that of a part of the molded resin portion 5 covering the surface of the side core portion 32 on the side of the opening 83. The protruding portion 6 may be provided over an entire length of the end core portion 34 from the side of the opening 83 of the case 8 to the side of the bottom plate portion 81. That is, the thickness of the protruding portion 6 may correspond to the depth of the case 8. If the thickness of the protruding portion 6 is increased, a used amount of the expensive resin, which will become the sealing resin portion 9, is reduced. Thus, manufacturing cost can be reduced accordingly.

The protruding portion 6 functions to restrict the position of the assembly 10 in the length direction with respect to the case 8. For example, the tip of the protruding portion 6 in a projecting direction thereof contacts the inner surface of the short side part 821. By the contact of the protruding portion 6 with the inner surface of the short side part 821, the assembly 10 can be satisfactorily positioned with respect to the case 8. Particularly, a positional deviation of the assembly 10 caused by a flow of the resin can be suppressed in forming the sealing resin portion 9.

[Case]

By accommodating the assembly 10 as shown in FIGS. 1 and 2, the case 8 can mechanically protect the assembly 10 and protect the assembly 10 from an external environment. Protection from the external environment aims to improve corrosion resistance and the like. The case 8 of this example is made of metal. Metals are higher in thermal conductivity than resins. Thus, the case 8 made of metal easily dissipates the heat of the assembly 10 to outside via the case 8. Therefore, the case 8 made of metal contributes to an improvement in the heat dissipation of the assembly 10.

The case 8 includes the bottom plate portion 81, the side wall portion 82 and the opening 83. The bottom plate portion 81 is a flat plate member, on which the assembly 10 is placed. The side wall portion 82 is a rectangular frame body for surrounding the assembly 10. The case 8 is a bottomed tubular container in which an accommodation space for the assembly 10 is formed by the bottom plate portion 81 and the side wall portion 82 and the opening 83 is formed on a side facing the bottom plate portion 81. In this example, the bottom plate portion 81 and the side wall portion 82 are integrally formed. The side wall portion 82 has a height equal to or more than that of the assembly 10.

The bottom plate portion 81 of this example is in the form of a rectangular plate. In the bottom plate portion 81, an inner bottom surface on which the assembly 10 is placed is substantially constituted by a flat surface. The side wall portion 82 includes the pair of short side parts 821, 822 and the pair of long side parts 823, 824. The inner surfaces of the short side parts 821, 822 and the long side parts 823, 824 of this example are substantially constituted by flat surfaces. The respective corners formed by the short side parts 821, 822 and the long side parts 823, 824 are constituted by curved surfaces.

A rectangular frame shape of the side wall portion 82 of this example means that the inner peripheral surface of the side wall portion 82 defines a substantially rectangular shape when the case 8 is viewed from above. The rectangular shape here may not be rectangular in a geometrically strict sense and may be included in a range regarded as substantially rectangular including rectangular shapes with rounded corners or chamfered corners. For example, this range includes a rectangular shape with corners formed by curved surfaces having a relatively large radius of curvature as in the side wall portion 82 of this example.

The inner surface of the side wall portion 82 may be inclined to expand from the side of the bottom plate portion 81 toward the side of the opening 83. More specifically, at least either the inner surfaces of the long side parts 821, 822 or the inner surfaces of the long side parts 823, 824 of the side wall portion 82 may be inclined to be more spaced apart from each other from the side of the bottom plate portion 81 toward the side of the opening 83. That is, at least one of the inner surfaces of the short side parts 821, 822 and the long side parts 823, 824 may be inclined outwardly of the case 8 with respect to a perpendicular direction to the inner bottom surface of the bottom plate portion 81. Note that the above perpendicular direction is equivalent to the height direction of the case 8.

If the respective inner surfaces of the short side parts 821, 822 and the long side parts 823, 824 are inclined to be more spaced apart from each other from the side of the bottom plate portion 81 toward the side of the opening 83, an operation of the accommodating the assembly 10 into the case 8 is easily performed in a manufacturing process of the reactor 1A. Further, in the case of manufacturing the case 8 made of metal by die casting, an operation of removing the case 8 from a mold is easily performed since at least one of the respective inner surfaces of the short side parts 821, 822 and the long side parts 823, 824 is inclined. In this example, all the inner surfaces of the short side parts 821, 822 and the long side parts 823, 824 are inclined to expand the inner surface of the side wall portion 82 from the side of the bottom plate portion 81 toward the side of the opening 83 as shown in FIG. 2.

Angles of inclination between the respective inner surfaces of the short side parts 821, 822 and the long side parts 823, 824 and a perpendicular to the inner bottom surface of the bottom plate portion 81 can be appropriately selected. The angles of inclination are, for example, 0.5° or more and 5° or less and, further, 1° or more and 2° or less. If the angles of inclination are too large, the interval between the outer peripheral surface of the assembly 10 and the inner peripheral surface of the side wall portion 82 becomes larger on the side of the opening 83. If the above interval is too large, heat of the assembly 10 on the side of the opening 83 is unlikely to be efficiently dissipated to the case 8. Thus, too large angles of inclination are not preferable also in terms of heat dissipation. Therefore, an upper limit of the angles of inclination is set to be 5° or less and, further, 2° or less.

A length of the case 8 is, for example, 80 mm or more and 120 mm or less and, further, 90 mm or more and 115 mm or less. A width of the case 8 is, for example, 30 mm or more and 80 mm or less and, further, 35 mm or more and 70 mm or less. A height of the case 8 is, for example, 70 mm or more and 140 mm or less and, further, 80 mm or more and 130 mm or less. The length of the case 8 is a length in the lateral direction on the planes of FIGS. 1 and 2. The width of the case 8 is a length in the vertical direction on the plane of FIG. 1. The height of the case 8 is a length in the vertical direction on the plane of FIG. 2. A volume of the case 8 is, for example, 120 $cm^2$ or more and 1200 $cm^3$ or less and, further, 200 $cm^2$ or more and 900 $cm^3$ or less. The case 8 of this example has the length larger than the width and has the height larger than the width. Thus, an area obtained by the length×width of the case 8 is smaller than an area obtained by the length×height of the case 8.

<Constituent Material>

The case 8 is made of nonmagnetic metal. Examples of nonmagnetic metal include aluminum, alloys thereof, magnesium and alloys thereof, copper and alloys thereof, silver and alloys thereof and austenite-based stainless steels. These metals are relatively high in thermal conductivity. Thus, the case 8 can be used as a heat dissipation path, and the heat of the assembly 10 is efficiently dissipated to outside via the case 8. Therefore, the heat dissipation of the assembly 10 is improved. Besides metals, resins and the like can be used as the material for constituting the case 8.

The case 8 made of metal can be, for example, manufactured by die casting. The case 8 of this example is constituted by a die cast product made of aluminum.

[Arrangement Mode of Assembly]

An arrangement mode of the assembly 10 with respect to the case 8 is a horizontal type. In this case, as shown in FIG. 2, the assembly 10 is so accommodated in the case 8 that the exposed surfaces of the winding portion 20 not facing the respective side core portions 32, 33 face toward the long side parts 823, 824 of the side wall portion 82 of the case 8 and the axial direction of the winding portion 20 is parallel to the bottom plate portion 81 of the case 8. That is, the assembly 10 is so accommodated in the case 8 that the arrangement direction of the middle core portion 31 and the side core portions 32, 33 is the depth direction of the case 8. In the case of this example, since the molded resin portion 5 includes the protruding portion 6 on the side of the one short side part 821, the assembly 10 is arranged off to the side of the other short side part 822 with respect to the case 8. If the arrangement mode of the assembly 10 is the horizontal type, heat of the coil 2 is easily dissipated to the case 8 since the exposed surfaces of the winding portion 20 are facing the long side parts 823, 824 of the case 8. Thus, if the arrangement mode of the assembly 10 is the horizontal type, heat dissipation is better as compared to the case where the arrangement mode of the assembly is the flat type described above. Further, if the arrangement mode of the assembly 10 is the horizontal type, the both end parts of the winding wire of the winding portion 20 are easily pulled out to the side of the opening 83 of the case 8 as compared to the case where the arrangement mode is a vertical type to be described in a second embodiment.

Further, if the outer peripheral surface of the winding portion 20 are substantially constituted by flat surfaces as in this example, a facing area of the winding portion 20 and the side wall portion 82 can be increased. Thus, the reactor 1A can efficiently utilize the case 8 as a heat dissipation path. Therefore, the reactor 1A easily dissipates the heat of the coil 2 to the case 8 and is excellent in the heat dissipation of the assembly 10.

An interval between the inner surface of the side wall portion 82 excluding the one short side part 821 and the outer surface of the assembly 10 is, for example, 0.5 m or more and 1.5 mm or less and, further, 0.5 mm or more and 1 mm or less. This interval is an interval between a part of the assembly 10 closest to the side wall portion 82 and the short side part 822 and the long side parts 823, 824 of the side wall portion 82. As described later, if the respective inner surfaces of the short side part 822 and the long side parts 823, 824 of the side wall portion 82 are inclined, a minimum value may be adopted as the above interval. Since this interval is 0.5 mm or more, the resin, which will become the sealing resin portion 9, flows between the assembly 10 and the side wall portion 82. On the other hand, since the interval is 1.5 mm or less and, further, 1 mm or less, the case 8 is easily reduced in size. Further, since interval is 1.5 mm or less and, further, 1 mm or less, the interval between the outer surface of the winding portion 20 and the inner surface of the side wall portion 82 is reduced, wherefore the heat dissipation of the assembly 10 can be improved.

[Gaps]

As shown in FIG. 1, the gaps 7 are formed between the inner surface of the side wall portion 82 including the one short side part 821 and the protruding portion 6 when the reactor 1A is viewed from above. In this example, the gaps 7 are formed by the one short side part 821, the long side parts 823, 824 and the protruding portion 6. That is, the gaps 7 are formed on both sides of the protruding portion 6 on the side of the one short side part 821.

Figure 4:
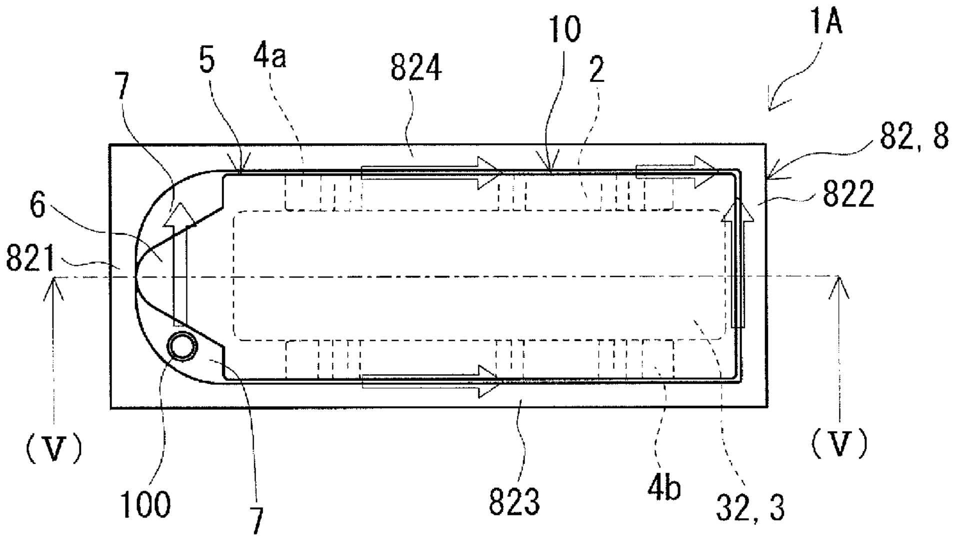
FIG. 4 is a schematic plan view showing a step of forming a sealing resin portion.
Figure 5:
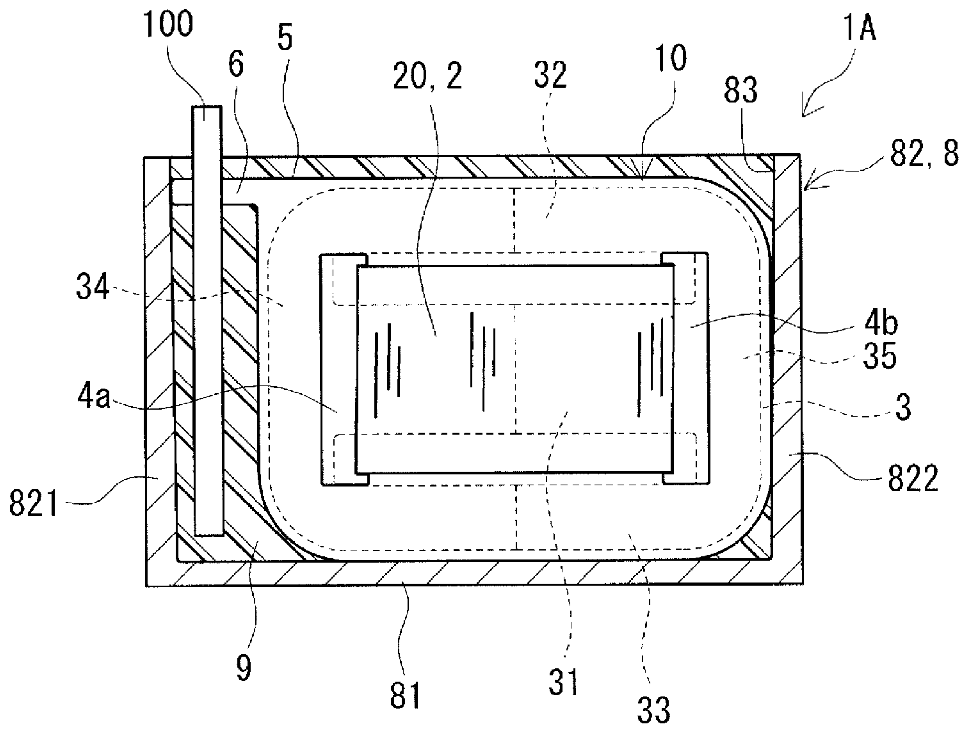
FIG. 5 is a schematic side view partly in section showing the step of forming the sealing resin portion.

In forming the sealing resin portion 9, a nozzle 100 for injecting the resin, which will become the sealing resin portion 9, is inserted into the gap 7 as shown in FIGS. 4 and 5. The size of the gap 7 is not particularly limited as long as the nozzle 100 is insertable thereinto when the reactor 1A is viewed from above. The size of the gap 7 can be adjusted according to the size of the protruding portion 6. Thus, even if a diameter of the nozzle 100 is large, the gap 7 into which the nozzle 100 is insertable can be easily provided. For example, the gap 7 has, for example, a diameter of 4 mm or more and, further, 5 mm or more in a plan view. The gap 7 is formed to be continuous from the side of the opening 83 to the side of the bottom plate portion 81 of the case 8.

[Sealing Resin Portion]

The sealing resin portion 9 is filled into the case 8 and seals at least a part of the assembly 10. The assembly 10 can be mechanically protected and protected from an external environment by the sealing resin portion 9. Protection from the external environment aims to improve corrosion resistance and the like.

In this example, the sealing resin portion 9 is filled up to an opening end of the case 8 and the entire assembly 10 is embedded in the sealing resin portion 9. Only a part of the assembly 10 may be sealed by the sealing resin portion 9. For example, out of the assembly 10, the entire winding portion 20 may be embedded in the sealing resin portion 9 and a member located closer to the opening 83 than the winding portion 20, i.e. a part of the molded resin portion 5, may be exposed from the sealing resin portion 9. The sealing resin portion 9 is interposed between the winding portion 20 and the side wall portion 82 of the case 8. In this way, the heat of the coil 2 can be transferred to the case 8 via the sealing resin portion 9. Thus, the heat dissipation of the assembly 10 is improved.

<Constituent Material>

Examples of the resin of the sealing resin portion 9 include thermosetting resins and thermoplastic resins. Examples of thermosetting resins include an epoxy resin, a urethane resin, a silicone resin and an unsaturated polyester resin. Examples of thermoplastic resins include a PPS resin. The sealing resin portion 9 of this example is made of silicone resin, more specifically, silicone gel. The higher the thermal conductivity of the sealing resin portion 9, the more preferable. The reason for this is that the heat of the coil 2 is easily transferred to the case 8. Thus, the material for constituting the sealing resin portion 9 may contain, for example, a filler as described above in addition to the above resin. Components of the above material may be adjusted to enhance the thermal conductivity of the sealing resin portion 9. The thermal conductivity of the sealing resin portion 9 is, for example, preferably 1 W/m·K or more and, further, 1.5 W/m·K or more.

Besides, an unillustrated adhesive layer may be provided between the assembly and the bottom plate portion 81. The adhesive layer can firmly fix the assembly 10 to the case 8. The adhesive layer is, for example, made of electrically insulating resin. Examples of the electrically insulating resin for constituting the adhesive layer include thermosetting resins and thermoplastic resins. Examples of thermosetting resins include an epoxy resin, a silicone resin and an unsaturated polyester resin. Examples of thermoplastic resins include a PPS resin and LCP. The material for constituting the adhesive layer may contain the above filler in addition to the resin. The adhesive layer may be formed by using a commercially available adhesive sheet or commercially available adhesive.

<<Manufacturing Method>>

Mainly with reference to FIGS. 4 and 5, an example of a manufacturing method of the reactor 1A described above is described. The reactor 1A can be manufactured by the manufacturing method including the following first to third steps.

In the first step, the assembly 10 and the case 8 are prepared.

In the second step, the assembly 10 is accommodated into the case 8.

In the third step, the sealing resin portion 9 is formed in the case 8.

FIG. 4 shows an arranged position of the nozzle 100 in the step of forming the sealing resin portion 9. FIG. 5 is a partial section along (V)-(V) shown in FIG. 4. FIG. 5 shows the external appearance of the assembly 10 in the case 8 when viewed from the side surface like FIG. 2, and shows a cross-section of the case 8 cut by a plane parallel to the side surface of the case 8.

[First Step]

In the first step, the assembly 10 and the case 8 are prepared. As shown in FIG. 3, the assembly 10 is obtained by fabricating a set by assembling the coil 2, the magnetic core 3 and the frame-like portions 4*a*, 4*b* and forming the molded resin portion 5 (FIG. 2) for this set. By forming the molded resin portion 5, the above set is integrated. Specifically, with the coil 2 and the magnetic core 3 held at predetermined positions by the frame-like portions 4*a*, 4*b*, the molded resin portion 5 is formed to cover the surfaces of the side core portions 32, 33 and the end core portions 34, 35. At this time, part of the resin for constituting the molded resin portion 5 is filled between the winding portion 20 and the middle core portion 31 through the cuts 47 provided in the frame-like portions 4*a*, 4*b* as described above. Thus, the molded resin portion 5 is formed to cover the surfaces of the side core portions 32, 33 and the end core portions 34, 35 and be interposed between the winding portion 20 and the middle core portion 31.

The prepared case 8 is, for example, made of nonmagnetic metal. The case 8 of this example is a die-cast product made of aluminum.

[Second Step]

In the second step, the assembly 10 is accommodated into the case 8 through the opening 83 of the case 8. The assembly 10 is so accommodated in the case 8 that the arrangement mode of the assembly 10 is the horizontal type described above. Specifically, as shown in FIG. 5, the assembly 10 is so accommodated in the case 8 that the exposed surfaces of the winding portion 20 not facing the respective side core portions 32, 33 face toward the long side parts 823, 824 of the side wall portion 82 of the case 8 and the axial direction of the winding portion 20 is parallel to the bottom plate portion 81 of the case 8.

[Third Step]

In the third step, the resin is filled into the case 8 to form the sealing resin portion 9 shown in FIG. 2. Specifically, as shown in FIGS. 4 and 5, the resin, which will become the sealing resin portion 9, is filled with the assembly 10 accommodated in the case 8. In this example, the nozzle 100 for injecting the resin is used. In this example, the resin, which will become the sealing resin portion 9, is a silicone resin, more specifically, a silicone gel.

The resin is filled by inserting the nozzle 100 into the gap 7 formed by the inner surface of the short side part 821 of the side wall portion 82, the inner surface of the long side part 823 and the protruding portion 6 as shown in FIG. 4. Then, as shown in FIG. 5, the resin in a fluid state is injected from the side of the bottom plate portion 81 through the nozzle 100. For example, a thermosetting resin is mixed and stirred and injected. Here, a case where the nozzle 100 is inserted into one gap 7 on the side of the long side part 823 is illustrated as shown in FIG. 4. A diameter of the nozzle 100 is, for example, 3.5 mm or more and 5 mm or less. The tip of the nozzle 100 is preferably brought to the vicinity of the bottom plate portion 81. The tip of the nozzle 100 may not be brought to the vicinity of the bottom plate portion 81.

If the resin is poured from the side of the opening 83 of the case 8, air bubbles are easily mixed into the resin and tend to remain in the sealing resin portion 9. Particularly, the air bubbles tend to remain in the sealing resin portion 9 on the side of the bottom plate portion 81. If the nozzle 100 is inserted into the gap 7 and the resin is injected from the side of the bottom plate portion 81 to the side of the opening 85, air bubbles are hardly mixed into the resin and hardly remain in the sealing resin portion 9. Particularly, it can be avoided that the air bubbles remain in the sealing resin portion 9 on the side of the bottom plate portion 81. Thus, the sealing resin portion 9 can be satisfactorily filled into the case 8.

In the case of this example, the protruding portion 6 provided on the molded resin portion 5 contacts the short side part 821 of the side wall portion 82, whereby a state where the assembly 10 is positioned with respect to the case 8 can be maintained. Thus, a positional deviation of the assembly 10 an be effectively suppressed at the time of filling the resin, which will become the sealing resin portion 9.

If the nozzle 100 is inserted into the gap 7 provided on the side of the one short side part 821 and the resin is injected as shown in FIG. 5, the resin flows from the side of the short side part 821 toward the other short side part 822. As shown by white arrows in FIG. 4, the resin injected from the nozzle 100 flows between the assembly 10 and the long side parts 823, 824 from the side of the one short side part 821 and resin flows merge on the side of the other short side part 822. Thus, a merging point of the resin is created at a location distant from a location where the resin was injected. In this case, air bubbles mixed into the resin float up while the resin is flowing from the side of the one short side part 821 toward the side of the other short side part 822, and the air bubbles in the resin are easily removed. Thus, the remaining of the air bubbles in the sealing resin portion 9 can be reduced by injecting the resin from the side of the one short side part 821. Further, if the resin is injected from the side of the one short side part 821, the merging point of the resin is one location on the side of the other short side part 822. Since the entrainment of air bubbles easily occurs at the merging point of the resin, less merging points are preferable. Since the resin merges at one location by injecting the resin from the one short side part 821, the remaining of air bubbles is easily reduced.

Although the case where the nozzle 100 is inserted into one gap 7 on the side of the long side part 823 and the resin is injected is illustrated in the example of FIG. 4, there is no limitation to this. A nozzle may be also inserted into the gap 7 on the side of the long side part 824 and the resin may be injected from two nozzles.

The resin is preferably injected by placing the case 8 accommodating the assembly 10 in a vacuum tank and injecting the resin in a vacuum state. The generation of air bubbles in the sealing resin portion 9 can be suppressed by injecting the resin in the vacuum state.

By solidifying the resin after the resin is filled into the case 8, the sealing resin portion 9 shown in FIG. 2 is formed. The resin may be solidified under appropriate conditions according to the used resin.

<<Effects>>

The reactor 1A of the first embodiment achieves the following effects.

The reactor 1A includes the protruding portion 6 provided on the molded resin portion 5 and the gaps 7 formed by the one short side part 821, the long side parts 823, 824 and the protruding portion 6. Thus, in forming the sealing resin portion 9, the resin, which will become the sealing resin portion 9, can be filled by inserting the nozzle 100 into the gap 7. The size of the gap 7 can be adjusted according to the size of the protruding portion 6. Thus, even if the diameter of the nozzle 100 is large, the gap 7 corresponding to the diameter of the nozzle 100 can be easily formed. If the diameter of the nozzle 100 is large, a resin filling operation can be efficiently performed. Therefore, the productivity of the reactor 1A is excellent.

In forming the sealing resin portion 9, the resin can be injected by inserting the nozzle 100 into the gap 7. Thus, a resin introduction path needs not be provided in the side wall portion 82 of the case 8 and no special processing is necessary for the case 8. Therefore, the reactor 1A can reduce the manufacturing cost of the case 8.

The protruding portion 6 is integrally molded to the molded resin portion 5. The assembly 10 is obtained by fabricating the set by assembling the coil 2, the magnetic core 3 and the frame-like members 4*a*, 4*b* and forming the molded resin portion 5 for this set. If the protruding portion 6 is provided on the molded resin portion 5, the protruding portion 6 can be formed together by the resin, which will become the molded resin portion 5, in forming the molded resin portion 5 for the set. Therefore, the reactor 1A in which the protruding portion 6 is constituted by the molded resin portion 5 is excellent in productivity.

The protruding portion 6 and the gaps 7 are provided only on the side of the one short side part 821. Thus, the interval between the side wall portion 82 excluding the one short side part 821 and the assembly 10 can be reduced. Therefore, the reactor 1A can be reduced in size.

Second Embodiment

A reactor 1B according to a second embodiment is described with reference to FIG. 6. A basic configuration of the reactor 1B is similar to that of the reactor 1A of the first embodiment. The reactor 1B of the second embodiment differs from the reactor 1A of the first embodiment in that an arrangement mode of an assembly 10 is a vertical type. The following description is centered on points of difference from the first embodiment described above and similar matters are not described.

Figure 6:
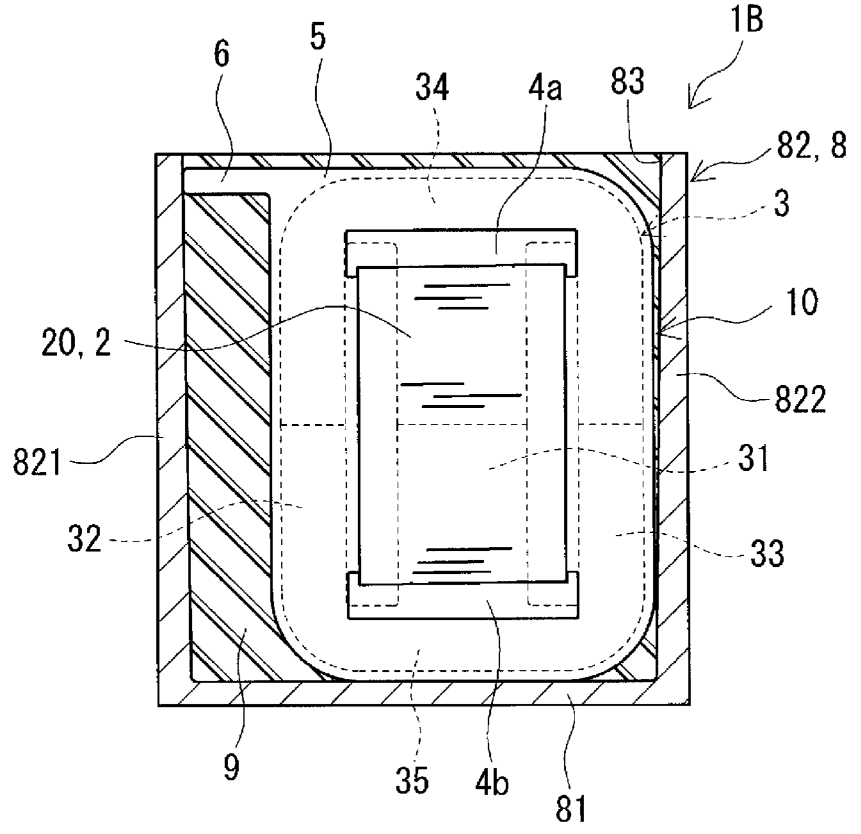
FIG. 6 is a schematic side view partly in section of a reactor according to a second embodiment.

FIG. 6 shows the external appearance of the assembly 10 in a case 8 when viewed from a side surface like FIG. 2, and shows cross-sections of the case 8 and a sealing resin portion 9 cut by a plane parallel to the side surface.

[Arrangement Mode of Assembly]

The arrangement mode of the assembly 10 with respect to the case 8 is the vertical type. In this case, as shown in FIG. 6, the assembly 10 is so accommodated in the case 8 that exposed surfaces of a winding portion 20 not facing respective side core portions 32, 33 face toward long side parts 823, 824 (FIG. 1) of a side wall portion 82 of the case 8 and an axial direction of the winding portion 20 is a depth direction of the case 8. If the arrangement mode of the assembly 10 is the vertical type, the magnetic core 3 is so arranged in the case 8 that longitudinal directions of a middle core portion 31 and the side core portions 32, 33 are orthogonal to a bottom plate portion 81 of the case. Thus, if the arrangement mode of the assembly 10 is the vertical type, one end core portion 34 and one frame-like member 4_a_ are located on the side of an opening 83 and the other end core portion 35 and the other frame-like member 4_b_ are located on the side of the bottom plate portion 81 of the case 8. If the arrangement mode of the assembly 10 is the vertical type, heat of a coil 2 is easily dissipated to the case 8 since the exposed surfaces of the winding portion 20 not facing the respective side core portions 32, 33 are facing the side wall portion 82 of the case 8 as in the case where the arrangement mode is the horizontal type described in the first embodiment. Thus, if the arrangement mode of the assembly 10 is the vertical type, heat dissipation is better as compared to the case where the arrangement mode is the flat type described above. Generally, a length of the winding portion 20 in a direction orthogonal to the axial direction is shorter than a length of the winding portion 20 in the axial direction. Therefore, if the arrangement mode of the assembly 10 is the vertical type, an installation area of the assembly 10 can be reduced and the size reduction of the reactor 1B can be more easily realized as compared to the case where the arrangement mode is the horizontal type described in the first embodiment.

If the arrangement mode of the assembly 10 is the vertical type, a protruding portion 6 extends in a direction orthogonal to the axial direction of the winding portion 20 as shown in FIG. 6. Also in the reactor 1B, in which the arrangement mode of the assembly 10 is the vertical type, gaps 7 (FIG. 1) are formed by one short side part 821, the long side parts 823, 824 and the protruding portion 6 as in the reactor 1A of the first embodiment. Thus, in forming the sealing resin portion 9, the resin, which will become the sealing resin portion 9, can be filled by inserting a nozzle 100 (FIG. 4) into the gap 7.

Third Embodiment

A reactor 1C according to a third embodiment is described with reference to FIGS. 7 and 8. A basic configuration of the reactor 1C is similar to that of the reactor 1A of the first embodiment. The reactor 1C of the third embodiment differs from the reactor 1A of the first embodiment in that one frame-like member 4_a_ is provided with protruding portions 6. In the reactor 1C, a molded resin portion 5 is provided with no protruding portion 6. The following description is centered on points of difference from the first embodiment described above and similar matters are not described.

Figure 7:
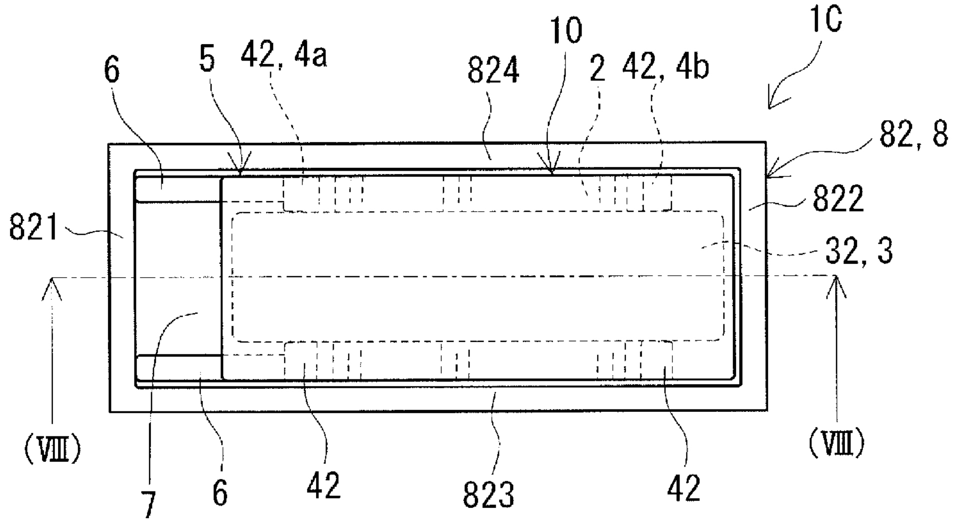
FIG. 7 is a schematic plan view of a reactor according to a third embodiment.
Figure 8:
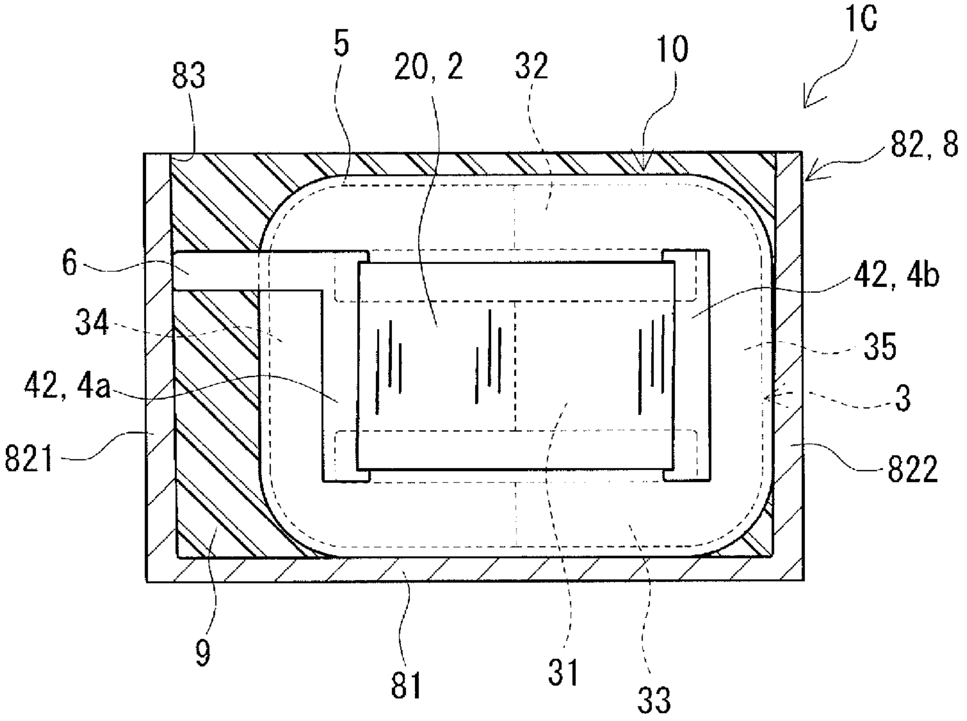
FIG. 8 is a schematic side view partly in section of the reactor according to the third embodiment.

A sealing resin portion 9 is not shown in FIG. 7 as in FIG. 1. FIG. 8 is a partial section along (VIII)-(VIII) shown in FIG. 7. FIG. 8 shows the external appearance of an assembly 10 in a case 8 when viewed from a side surface like FIG. 2, and shows cross-sections of the case 8 and the sealing resin portion 9 cut by a plane parallel to the side surface.

[Protruding Portion]

Second frame pieces 42 in the one frame-like member 4_a_ include the protruding portions 6 projecting toward one short side part 821. The protruding portion 6 is an integrated component integrally molded to the frame-like member 4_a_. The protruding portion 6 is provided on a surface of the second frame pieces 42 on the side of an end core portion 34. The frame-like member 4_a_ includes a pair of second frame pieces 42 (FIG. 3). The protruding portion 6 may be provided on at least one second frame piece 42. The protruding portion 6 of this example is provided on each second frame piece 42. Thus, the reactor 1C includes two protruding portions 6 as shown in FIG. 7. In the case of including the two protruding portions 6, a gap 7 is formed by the one short side part 821 and the two protruding portions 6 when the reactor 1C is viewed from above as shown in FIG. 7. The protruding portion 6 may be provided only on one second frame piece 42. In this case, the gap 7 is formed by the one short side part 821, the protruding portion 6 and one or the other long side part 823, 824 when the reactor 1C is viewed from above.

In the reactor 1C including the protruding portions 6 on the frame-like member 4_a_, the gap 7 (FIG. 7) is formed by the one short side part 821 and the protruding portions 6 as in the reactor 1A of the first embodiment. Thus, in forming the sealing resin portion 9, a resin, which will become the sealing resin portion 9, can be filled by inserting a nozzle 100 (FIG. 4) into the gap 7.

Fourth Embodiment

A reactor 1D according to a fourth embodiment is described with reference to FIG. 9. A basic configuration of the reactor 1D is similar to that of the reactor 1B of the second embodiment. In the reactor 1D, an arrangement mode of an assembly 10 is a vertical type. The reactor 1D of the fourth embodiment differs from the reactor 1B of the second embodiment in that one frame-like member 4_a_ is provided with protruding portions 6. In the reactor 1D, a molded resin portion 5 is provided with no protruding portion 6. The following description is centered on points of difference from the second embodiment described above and similar matters are not described.

Figure 9:
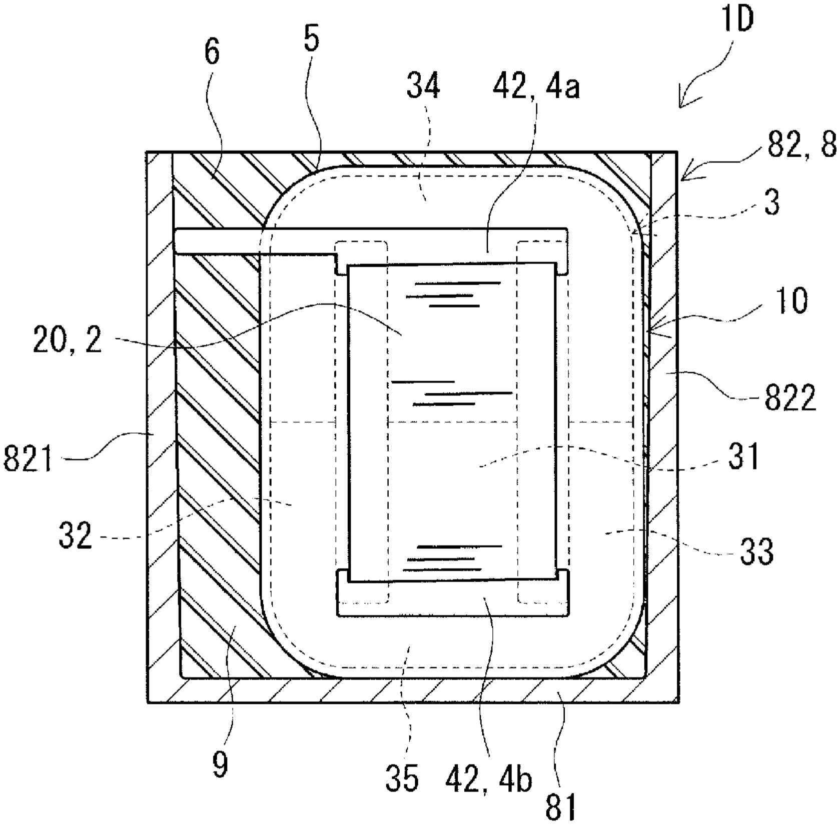
FIG. 9 is a schematic side view partly in section of a reactor according to a fourth embodiment.

FIG. 9 shows the external appearance of an assembly 10 in a case 8 when viewed from a side surface like FIG. 6, and shows cross-sections of the case 8 and a sealing resin portion 9 cut by a plane parallel to the side surface.

[Protruding Portion]

Second frame pieces 42 in the one frame-like member 4_a_ include the protruding portions 6 projecting toward one short side part 821. The protruding portion 6 is an integrated component integrally molded to the frame-like member 4_a_. The protruding portion 6 is provided on a surface of the second frame pieces 42 on the side of a side core portion 32. The frame-like member 4_a_ includes a pair of second frame pieces 42 (FIG. 3). The protruding portion 6 may be provided on at least one second frame piece 42. The protruding portion 6 of this example is provided on each second frame piece 42. Thus, the reactor 1C includes two protruding portions 6. In the case of including the two protruding portions 6, a gap 7 is formed by the one short side part 821 and the two protruding portions 6 when the reactor 1D is viewed from above (see FIG. 7) as in the third reactor 1C of the third embodiment. The protruding portion 6 may be provided only on one second frame piece 42. In this case, the gap 7 is formed by the one short side part 821, the protruding portion 6 and one or the other long side part 823, 824 when the reactor 1D is viewed from above.

In the reactor 1D including the protruding portions 6 on the frame-like member 4_a_, the gap 7 (FIG. 7) is formed by the one short side part 821 and the protruding portions 6 as in the reactor 1B of the second embodiment. Thus, in forming the sealing resin portion 9, a resin, which will become the sealing resin portion 9, can be filled by inserting a nozzle 100 (FIG. 4) into the gap 7.

Fifth Embodiment

A reactor 1E according to a fifth embodiment is described with reference to FIGS. 10 and 11. A basic configuration of the reactor 1E is similar to that of the reactor 1A of the first embodiment. The reactor 1E of the fifth embodiment differs from the reactor 1A of the first embodiment in that a protruding portion 6 is provided with a through hole 63 and a part of a sealing resin portion 9 is filled in this through hole 63. The following description is centered on points of difference from the first embodiment described above and similar matters are not described.

Figure 10:
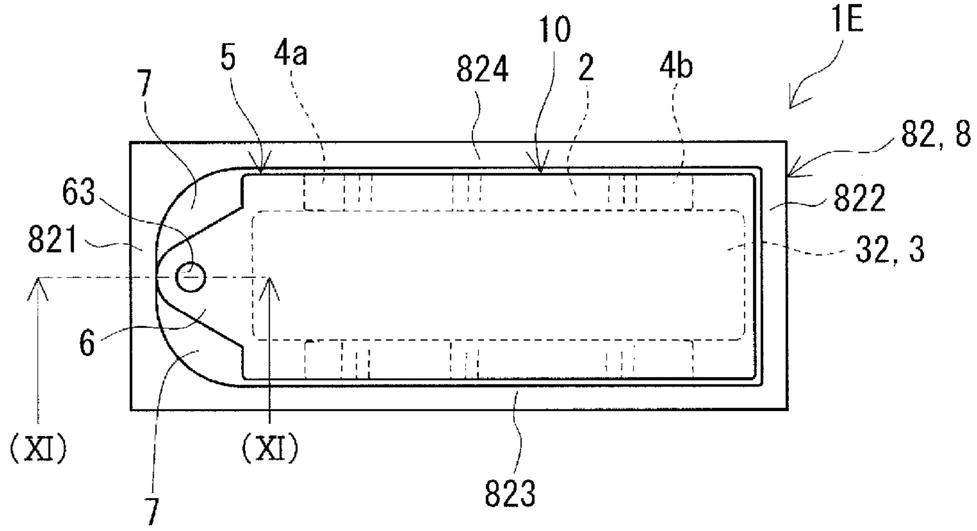
FIG. 10 is a schematic plan view of a reactor according to a fifth embodiment.
Figure 11:
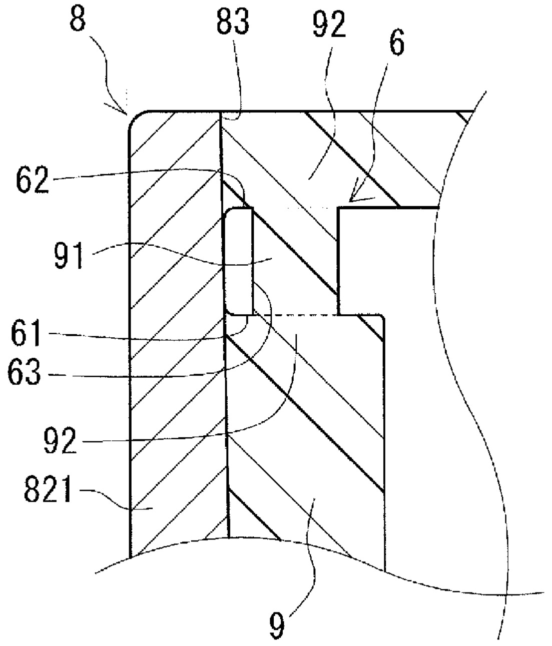
FIG. 11 is a schematic side view partly in section of the reactor according to the fifth embodiment.

FIG. 11 is a partial section along (XI)-(XI) shown in FIG. 10 showing the vicinity of the protruding portion 6. FIG. 11 shows the external appearance of an assembly 10 in a case 8 when viewed from a side surface like FIG. 2, and shows cross-sections of the case 8 and the sealing resin portion 9 cut by a plane parallel to the side surface.

[Protruding Portion]

As shown in FIG. 11, the protruding portion 6 has a first surface 61 located on the side of a bottom plate portion 81 (FIG. 2) of the case 8 and a second surface 62 located on the side of an opening 83 of the case 8. The protruding portion 6 includes the through hole 63 penetrating through the first surface 61 and the second surface 62 as shown in FIGS. 10 and 11. In this example, one through hole 63 is provided in a widthwise center of the protruding portion 6 (FIG. 10). A plurality of the through holes 63 may be provided in the protruding portion 6.

The through hole 63 of this example is constituted by a circular hole having a uniform diameter. The through hole 63 may be formed into a tapered shape having a diameter gradually decreasing from the side of the first surface 61 toward the side of the second surface 62. A part of the sealing resin portion 9 is filled into the through hole 63. Thus, by forming the through hole 63 into a tapered shape, a larger contact area of the protruding portion 6 and the sealing resin portion 9 is easily secured as compared to a circular hole uniformly formed to have a diameter on a small side. Further, by forming the through hole 63 into a tapered shape, the sealing resin portion 9 is easily caught in a region leading to the first surface 61 from the tapered surface. A cross-sectional shape of the through hole 63 is not limited to a circular shape and may be a polygonal shape.

[Sealing Resin Portion]

The sealing resin portion 9 includes a first resin portion 91 filled in the through hole 63 provided in the protruding portion 6 and a second resin portion 92 provided in contact with the first and second surfaces 61, 62. The first and second resin portions 91, 92 constitute an integrated object by being continuously provided.

The reactor 1E of the fifth embodiment includes the through hole 63 in the protruding portion 6, and the protruding portion 6 and the sealing resin portion 6 can be firmly joined and, consequently, the assembly 10 and the sealing resin portion 9 can be firmly joined by filling a part of the sealing resin portion 9 in the through hole 63. This is because the first resin portion 91 filled in the through hole 63 and the second resin portion 92 provided in contact with the first and second surfaces 61, 62 are caught by the protruding portion 6.

Besides, in the reactor 1E of the fifth embodiment, a resin filled state on the side of one short side part 821 can be confirmed through the through hole 63 in forming the sealing resin portion 9 by including the through hole 63 in the protruding portion 6. Further, in the reactor 1E of the fifth embodiment, air bubbles mixed into the resin being filled on the side of the one short side part 821 can be removed through the through hole 63 in forming the sealing resin portion 9 by including the through hole 63 in the protruding portion 6.

Sixth Embodiment

A reactor 1F according to a sixth embodiment is described with reference to FIGS. 12 and 13. The reactor 1F of the sixth embodiment differs from the reactor 1A of the first embodiment in that a short side part 821 is provided with a mounting seat 84 for supporting a protruding portion 6 and the protruding portion 6 and the mounting seat 84 are fastened. The following description is centered on points of difference from the first embodiment described above and similar matters are not described.

Figure 12:
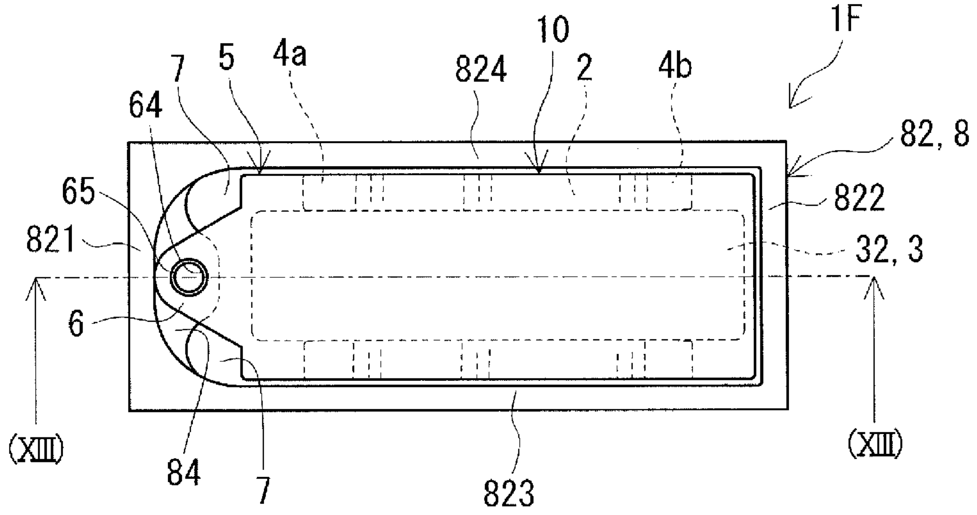
FIG. 12 is a schematic plan view of a reactor according to a sixth embodiment.
Figure 13:
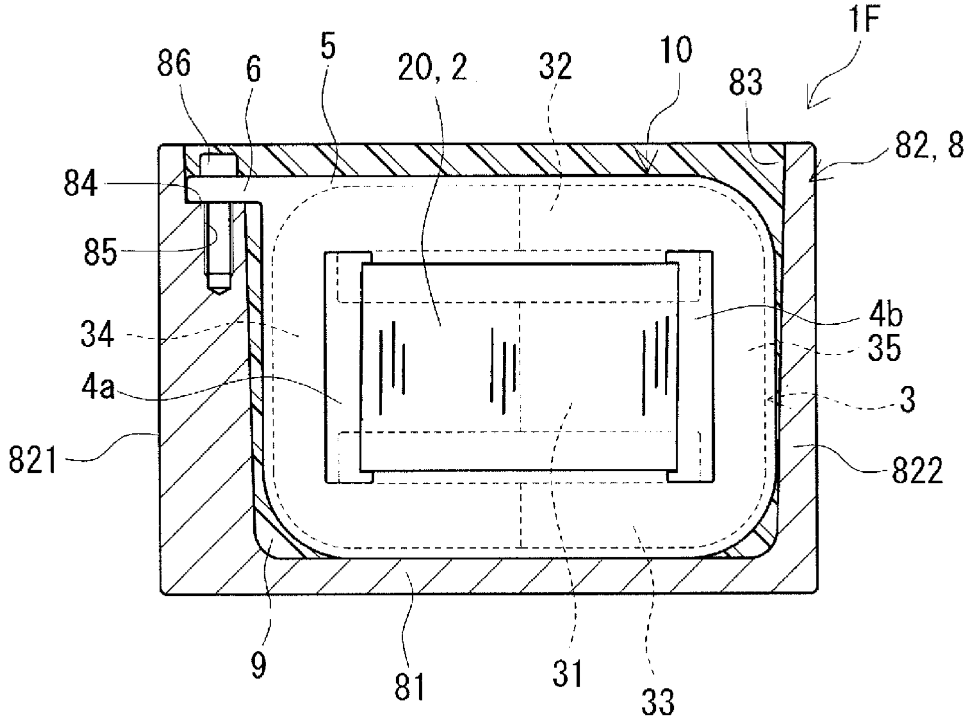
FIG. 13 is a schematic side view partly in section of the reactor according to the sixth embodiment.

FIG. 13 is a partial section along (XIII)-(XIII) shown in FIG. 12. FIG. 13 shows the external appearance of an assembly 10 in a case 8 when viewed from a side surface like FIG. 2, and shows cross-sections of the case 8 and a sealing resin portion 9 cut by a plane parallel to the side surface.

[Mounting Seat]

As shown in FIG. 13, the mounting seat 84 projects into the case 8 from the short side part 821 and supports a surface of the protruding portion 6 on the side of a base plate portion 81. As shown in FIG. 12, the mounting seat 84 is provided to overlap the protruding portion 6 when the reactor 1F is viewed from above. In this example, the mounting seat 84 extends along the inner surface of the short side part 821 from the base plate portion 81. The mounting seat 84 is provided with a screw hole 85 in an upper surface on the side of an opening 83 of the case 8.

[Protruding Portion]

As shown in FIGS. 12 and 13, the protruding portion 6 includes a through hole 64 penetrating through a first surface located on the side of the bottom plate portion 81 of the case 8 and a second surface located on the side of the opening 83 of the case 8. The through hole 64 of this example is formed by embedding a collar 65 made of metal in the protruding portion 6. The collar 65 can be embedded in the protruding portion 6, for example, by insert molding. The through hole 64 is provided at a position overlapping the screw hole 85 of the mounting seat 84 when the reactor 1F is viewed from above.

The protruding portion 6 may further include another unillustrated through hole in addition to the through hole 64 overlapping the screw hole 85 of the mounting seat 84. A part of a sealing resin portion 9 is filled into the other through hole. The other through hole, into which the part of the sealing resin portion 9 is filled, has a function of the through hole 63 described in the fifth embodiment.

In this example, as shown in FIG. 13, the protruding portion 6 and the mounting seat 84 are fastened by a bolt 86. The bolt 86 is not shown in FIG. 12. The bolt 86 is screwed into the screw hole 85 of the mounting seat 84 through the through hole 64 of the protruding portion 6 from the side of the opening 83 of the case 8. A head part of the bolt 86 is located inwardly of the opening 83 of the case 8. Thus, the head part of the bolt 86 does not project from the opening 83 of the case 8. In this example, the head part of the bolt 86 is embedded in the sealing resin portion 9 and not exposed from the sealing resin portion 9.

In the reactor 1F of the sixth embodiment, the assembly 10 can be firmly fixed to the case 8 by fastening the protruding portion 6 to the mounting seat 84. Thus, the reactor 1F can avoid the detachment of the assembly 10 from the case 8, for example, due to an impact, vibration or the like. Further, in this example, the mounting seat 84 is formed to extend from the base plate portion 81 toward the opening 83 along the inner surface of the short side part 821. In the reactor 1F, since the mounting seat 84 is present in the case 8, a volume of the case 8 is reduced as compared to the reactor 1A of the first embodiment. Thus, a used amount of a resin, which will become the sealing resin portion 9, is reduced in the reactor 1F as compared to the reactor 1A. Thus, the reactor 1F can reduce manufacturing cost since the used amount of the expensive resin, which will become the sealing resin portion 9, is reduced.

Seventh Embodiment

A reactor 1G according to a seventh embodiment is described with reference to FIG. 14. A basic configuration of the reactor 1G is similar to that of the reactor 1A of the first embodiment. The reactor 1G of the seventh embodiment differs from the reactor 1A of the first embodiment in including projections 68, 69 on the outer peripheral surface of a molded resin portion 5. The following description is centered on points of difference from the first embodiment described above and similar matters are not described.

[Projections]

Figure 14:
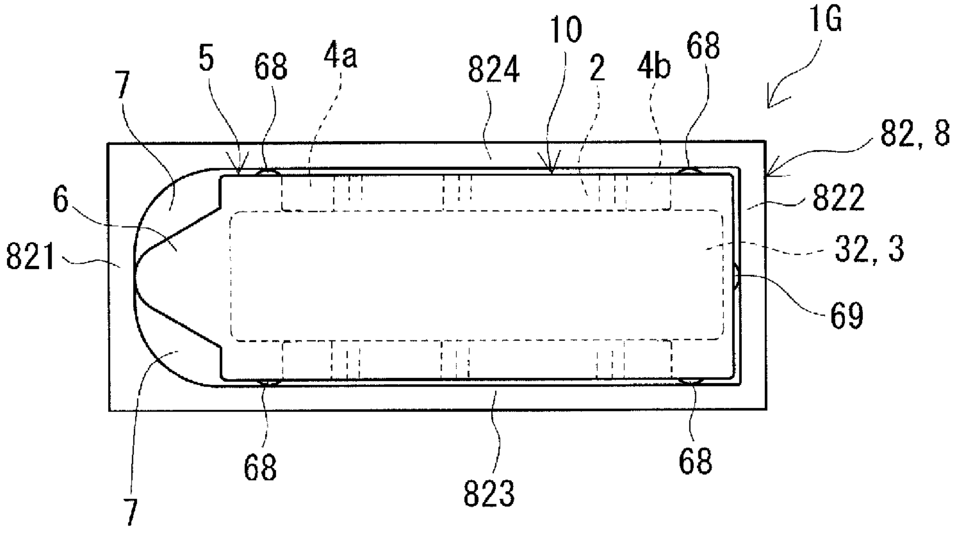
FIG. 14 is a schematic plan view of a reactor according to a seventh embodiment.

As shown in FIG. 14, the projections 68, 69 are provided to project toward the inner peripheral surface of a case 8 from the outer peripheral surface of the molded resin portion 5. The first projections 68 are provided on surfaces facing long side parts 823, 824 of the case 8. The second projection 69 is provided on a surface facing a short side part 822 of the case 8. That is, the second projection 69 is provided on a surface of an assembly 10 opposite to the protruding portion 6.

The numbers, positions and shapes of the projections 68, 69 are not particularly limited and can be appropriately selected. For example, one projection 68 may be provided or a plurality of the projections 68 may be provided. In this example, two first projections 68 are provided at an interval in a length direction on each of the surfaces of the molded resin portion 5 facing the both long side parts 823, 824. Further, one projection 69 is provided in a widthwise center on the surface of the molded resin portion 5 facing the short side part 822. The positions of the projections 68, 69 along a depth direction of the case 8 are preferably on the side of an opening 83 of the case 8. If the projections 68, 69 are located on the side of the opening 83, the assembly 10 is easily stably supported in the case 8. The projection 68, 69 has a hemispherical shape. A projecting amount of the projection 68, 69 can be appropriately set according to an interval between the outer peripheral surface of the molded resin portion 5 and the long side parts 823, 824 and the short side part 822 of a side wall portion 82. The projecting amount of the projection 68, 69 is, for example, 0.5 mm or more and 1.5 mm or less.

In the reactor 1G of the seventh embodiment, the interval between the outer peripheral surface of the assembly 10 and the inner peripheral surface of the side wall portion 82 is easily properly maintained by including the projections 68, 69 on the outer peripheral surface of the molded resin portion 5. The projections 68, 69 may be in contact with the inner peripheral surface of the side wall portion 82. By the contact of the projections 68 with the respective inner surfaces of the long side parts 823, 824, the assembly 10 is easily positioned in the width direction with respect to the case 8. Further, by the contact of the projection 69 with the inner surface of the short side part 822, the assembly 10 is easily positioned in the length direction with respect to the case 8. Particularly, if the inner peripheral surface of the side wall portion 82 is inclined to expand from the side of a bottom plate portion 81 toward the side of the opening 83, the projections 68, 69 respectively contact the inner surfaces of the long side parts 823, 824 and the inner surface of the short side part 822, whereby excessive inclination of the assembly 10 in the case 8 can be suppressed.

Eighth Embodiment

The respective reactors according to the first to seventh embodiments can be utilized in an application satisfying the following energization conditions. The energization conditions are, for example, a maximum direct current of about 100 A or more 1000 A or less, an average voltage of about 100 V or more and 1000 V or less, and a use frequency of about 5 kHz or more and 100 kHz or less. The respective reactors according to the first to seventh embodiments can be utilized as a constituent component of a converter to be placed in a vehicle such as an electric or hybrid vehicle and as a constituent component of a power conversion device including this converter.

Figure 15:
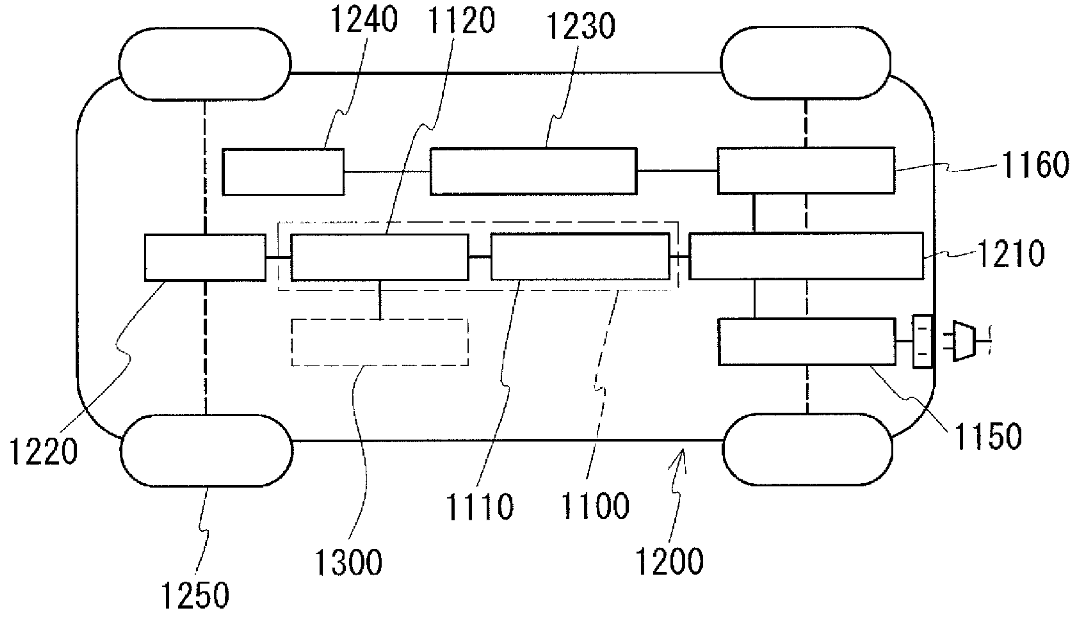
FIG. 15 is a schematic configuration diagram schematically showing a power supply system of a hybrid vehicle.

A vehicle 1200 such as an electric or hybrid vehicle includes a main battery 1210, a power conversion device 1100 connected to the main battery 1210 and a motor 1220 utilized for running by being driven by power supplied from the main battery 1210 as shown in FIG. 15. The motor 1220 is typically a three-phase AC motor, drives wheels 1250 during running, and functions as a generator at the time of regeneration. In the case of a hybrid vehicle, the vehicle 1200 includes an engine 1300 in addition to the motor 1220. Although an inlet is shown as a charging location of the vehicle 1200 in FIG. 15, a plug may be provided.

The power conversion device 1100 includes a converter 1110 connected to the main battery 1210 and an inverter 1120 connected to the converter 1110 for mutual conversion of a direct current and an alternating current. The converter 1110 shown in this example feeds power to the inverter 1120 by stepping up an input voltage of the main battery 1210 of about 200 V to 300 V to about 400 V to 700 V. The converter 1110 charges the main battery 1210 by stepping down the input voltage output from the motor 1220 via the inverter 1120 at the time of regeneration to a direct-current voltage compatible with the main battery 1210. The input voltage is a direct-current voltage. The inverter 1120 feeds power to the motor 1220 by converting a direct current stepped up by the converter 1110 into a predetermined alternating current during the running of the vehicle 1220, and converts the alternating current output from the motor 1220 into a direct current and outputs the converted direct current to the converter 1110 at the time of regeneration.

Figure 16:
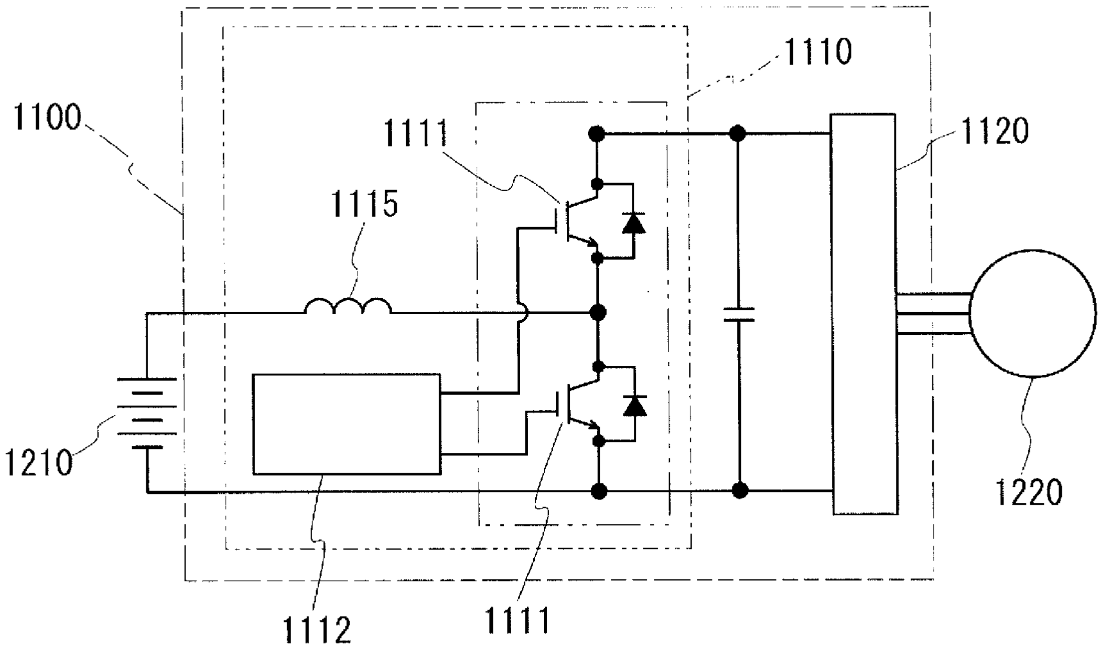
FIG. 16 is a schematic circuit diagram showing an example of a power conversion device including a converter.

The converter 1110 includes a plurality of switching elements 1111, a driving circuit 1112 for controlling the operation of the switching elements 1111 and a reactor 1115, and converts an input voltage by being repeatedly turned on and off as shown in FIG. 16. The conversion of the input voltage means the stepping up and stepping down of the voltage here. Power devices such as field-effect transistors and insulated bipolar transistors are utilized as the switching elements 1111. The reactor 1115 has a function of smoothening a change of a current when the current is increased or decreased by a switching operation, utilizing properties of a coil to block a change of a current flowing into a circuit. Any one of the reactors of the first to seventh embodiments is provided as the reactor 1115. By including the reactor small in size and excellent in productivity, a size reduction and an improvement in producibility can be expected also for the power conversion device 1100 and the converter 1110.

The vehicle 1200 includes a power feeder converter 1150 connected to the main battery 1120 and an auxiliary equipment power supply converter 1160 connected to a sub-battery 1230 serving as a power supply for auxiliary equipment 1240 and the main battery 1210 and configured to convert a high voltage of the main battery 1210 into a low voltage. The converter 1110 typically performs a DC-DC conversion, but the power feeder converter 1150 and the auxiliary equipment power supply converter 1160 perform an AC-DC conversion. Some of the power feeder converters 1150 may perform a DC-DC conversion. Reactors configured similarly to the reactor of any one of the first to seventh embodiments and having the sizes, shapes and the like thereof changed as appropriate can be utilized as reactors of the power feeder converter 1150 and the auxiliary equipment power supply converter 1160. Further, the reactor of any one of the first to seventh embodiments can also be utilized in a converter for converting an input voltage and only stepping up or stepping down the voltage.

LIST OF REFERENCE NUMERALS

1A, 1B, 1C, 1D, 1E, 1F, 1G reactor
10 assembly
2 coil, 20 winding portion
3 magnetic core, 3*a*, 3*b* core piece
31 middle core portion, 32, 33 side core portion, 34, 35 end core portion
4*a*, 4*b* frame-like member
40 through hole, 41 first frame piece, 42 second frame piece
43 recess, 45 inner projecting piece, 46 outer projecting piece, 47 cut
5 molded resin portion
6 protruding portion
61 first surface, 62 second surface, 63, 64 through hole, 65 collar
68, 69 projection
7 gap
8 case
81 bottom plate portion
82 side wall portion, 821, 822 short side part, 823, 824 long side part
83 opening
84 mounting seat, 85 screw hole, 86 bolt
9 sealing resin portion
91 first resin portion, 92 second resin portion
100 nozzle
1100 power conversion device, 1110 converter, 1111 switching element
1112 driving circuit, 1115 reactor, 1120 inverter
1150 power feeder converter, 1160 auxiliary equipment power supply converter,
1200 vehicle, 1210 main battery, 1220 motor
1230 sub-battery, 1240 auxiliary equipment, 1250 wheel, 1300 engine

What is claimed is:

1. A reactor, comprising:
a coil including one winding portion;
a magnetic core having parts to be arranged inside and outside the winding portion;
a resin member for specifying mutual positions of the coil and the magnetic core;
a case for accommodating an assembly including the coil, the magnetic core and the resin member; and
a sealing resin portion to be filled into the case,
wherein:
the magnetic core includes:
a middle core portion to be arranged inside the winding portion;
two side core portions to be arranged in parallel to the middle core portion outside the winding portion; and
two end core portions connecting the middle core portion and the side core portions on both end parts of the winding portion,
the case includes:
a bottom plate portion, the assembly being placed on the bottom plate portion;
a side wall portion in the form of a rectangular frame for surrounding the assembly; and
an opening facing the bottom plate portion,
the side wall portion includes a pair of long side parts and a pair of short side parts,
the assembly is so arranged that exposed surfaces not facing the respective side core portions, out of an outer peripheral surface of the winding portion, face toward the long side parts,
the resin member includes a protruding portion projecting toward one of the short side parts,
a gap is formed by an inner surface of the side wall portion including the one short side part and the protruding portion when the case is viewed from above, and
a tip of the protruding portion in a projecting direction contacts an inner surface of the short side part.

2. A reactor, comprising:
a coil including one winding portion;
a magnetic core having parts to be arranged inside and outside the winding portion;
a resin member for specifying mutual positions of the coil and the magnetic core;
a case for accommodating an assembly including the coil, the magnetic core and the resin member; and
a sealing resin portion to be filled into the case,
wherein:
the magnetic core includes:
a middle core portion to be arranged inside the winding portion;
two side core portions to be arranged in parallel to the middle core portion outside the winding portion; and
two end core portions connecting the middle core portion and the side core portions on both end parts of the winding portion,
the case includes:
a bottom plate portion, the assembly being placed on the bottom plate portion;
a side wall portion in the form of a rectangular frame for surrounding the assembly; and
an opening facing the bottom plate portion,
the side wall portion includes a pair of long side parts and a pair of short side parts,
the assembly is so arranged that exposed surfaces not facing the respective side core portions, out of an outer peripheral surface of the winding portion, face toward the long side parts,
the resin member includes a protruding portion projecting toward one of the short side parts, but includes no protruding portion projecting toward the other short side part, and
a gap is formed by an inner surface of the side wall portion including the one short side part and the protruding portion when the case is viewed from above.

3. The reactor of claim 1, wherein:
the resin member includes a molded resin portion for at least partially covering the magnetic core, and
the protruding portion is provided on the molded resin portion.

4. The reactor of claim 1, wherein:

the resin member includes a pair of frame-like members to be provided on the both end parts of the winding portion, each frame-like member includes:

a pair of first frame pieces to be arranged between the middle core portion and the side core portions; and a second frame piece connecting the pair of first frame pieces along the exposed surface of the winding portion, and the protruding portion is provided on the second frame piece in one of the frame-like members.

5. The reactor of claim 1, wherein the assembly is so accommodated in the case that an axial direction of the winding portion is parallel to the bottom plate portion.

6. The reactor of claim 1, wherein the protruding portion is arranged on the opening side.

7. The reactor of claim 2, wherein a tip of the protruding portion in a projecting direction contacts an inner surface of the short side part.

8. The reactor of claim 1, wherein:

the protruding portion includes:

a first surface located on the bottom plate portion side;

a second surface located on the opening side; and a hole penetrating through the first surface and the second surface, and the sealing resin portion includes:

a first resin portion filled inside the hole, and a second resin portion continuous with the first resin portion, the second resin portion being provided in contact with the first surface and the second surface.

9. The reactor of claim 1, wherein:

the short side part includes a mounting seat for supporting the protruding portion; and the protruding portion and the mounting seat are fastened.

10. A converter, comprising the reactor of claim 1.

11. A power conversion device, comprising the converter of claim 10.

* * * * *